(12) United States Patent
Ping et al.

(10) Patent No.: US 12,706,897 B2
(45) Date of Patent: Aug. 11, 2026

(54) METHOD, APPARATUS, AND COMPUTER PROGRAM

(71) Applicant: Nokia Technologies Oy, Espoo (FI)

(72) Inventors: Jing Ping, Chengdu (CN); Anatoly Andrianov, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 130 days.

(21) Appl. No.: 18/688,578

(22) PCT Filed: Sep. 30, 2021

(86) PCT No.: PCT/CN2021/122439
§ 371 (c)(1),
(2) Date: Mar. 1, 2024

(87) PCT Pub. No.: WO2023/050420
PCT Pub. Date: Apr. 6, 2023

(65) Prior Publication Data

US 2024/0396882 A1 Nov. 28, 2024

(51) Int. Cl.
*H04L 9/40* (2022.01)

(52) U.S. Cl.
CPC .................................... *H04L 63/08* (2013.01)

(58) Field of Classification Search
CPC ........ H04L 63/08; H04L 63/20; H04W 12/60; H04W 12/06; H04W 12/69
See application file for complete search history.

(56) References Cited

U.S. PATENT DOCUMENTS

2008/0040773 A1 2/2008 Albadarin et al.
2014/0020073 A1* 1/2014 Ronda ................ H04L 63/0853 726/7
2015/0161378 A1 6/2015 Oberheide et al.
2017/0346811 A1* 11/2017 Newell ..................... H04L 9/14
2019/0104409 A1* 4/2019 Wu ......................... H04L 63/20

FOREIGN PATENT DOCUMENTS

CN 101958792 A 1/2011
CN 102098756 A 6/2011
CN 104254073 A 12/2014
CN 104580116 A 4/2015
(Continued)

OTHER PUBLICATIONS

Office action received for corresponding Chinese Patent Application No. 202211213065.5, dated May 24, 2025, 11 pages of office action and 12 pages of translation available.
(Continued)

*Primary Examiner* — El Hadji M Sall
(74) *Attorney, Agent, or Firm* — Barta Jones, PLLC

(57) ABSTRACT

An apparatus comprises means configured to: receive an authentication request from a management service consumer, the request comprising at least an identifier associated with an identity of the management service consumer and a credential used by the identity; and authenticate the management service consumer in dependence on the request, said authentication being dependent on one or more authentication policies associated with the management service consumer, different types of management service consumers being associated with one or more different authentication policies.

20 Claims, 11 Drawing Sheets

(56) References Cited

FOREIGN PATENT DOCUMENTS

| | | | |
|---|---|---|---|
| CN | 107634973 | A | 1/2018 |
| CN | 109344075 | A | 2/2019 |
| CN | 112335274 | A | 2/2021 |
| WO | 2022/000155 | A1 | 1/2022 |

OTHER PUBLICATIONS

"3rd Generation Partnership Project; Technical Specification Group Services and System Aspects; Telecommunication management; Generic Network Resource Model (NRM) Integration Reference Point (IRP); Information Service (IS) (Release 16)", 3GPP TS 28.622, V16.8.1, Jun. 2021, pp. 1-66.

"3rd Generation Partnership Project; Technical Specification Group Services and System Aspects; Telecommunication management; Generic Network Resource Model (NRM) Integration Reference Point (IRP); Solution Set (SS) definitions (Release 16)", 3GPP TS 28.623, V16.8.0, Jun. 2021, pp. 1-105.

"3rd Generation Partnership Project; Technical Specification Group Services and System Aspects; Management and orchestration; Generic management services; (Release 16)", 3GPP TS 28.532, V16.8.1, Jun. 2021, 227 pages.

"3rd Generation Partnership Project; Technical Specification Group Services and System Aspects; Management and orchestration; Network Slice Management Enhancement (Release 17)", 3GPP TR 28.811, V0.6.0, Sep. 2021, pp. 1-29.

"3rd Generation Partnership Project; Technical Specification Group Services and System Aspects; Management and orchestration; Concepts, use cases and requirements (Release 17)", 3GPP TS 28.530, V17.1.0, Mar. 2021, 32 pages.

"Zero-touch network and Service Management (ZSM); General Security Aspects", ETSI GR ZSM 010, V1.1.1, Jul. 2021, pp. 1-63.

International Search Report and Written Opinion received for corresponding Patent Cooperation Treaty Application No. PCT/CN2021/122439, dated Jun. 23, 2022, 9 pages.

"3rd Generation Partnership Project; Technical Specification Group Services and System Aspects; Management and orchestration; Study on access control for management service (Release 17)", 3GPP TR 28.817, V1.0.0, Sep. 2020, pp. 1-25.

"Possible solution to support access control on management service", 3GPP TSG SA WG5 Meeting 138-e, S5-214642, Agenda: 6.5.5, Nokia, Aug. 23-31, 2021, 6 pages.

Office action received for corresponding Chinese Patent Application No. 202211213065.5, dated Nov. 30, 2024, 12 pages of office action and 7 pages of translation available.

Chinese Office Action, with partial English translation, corresponding to CN Application No. 202211213065.5, dated Nov. 28, 2025.

Office action received for corresponding Chinese Patent Application No. 202211213065.5, dated Mar. 5, 2026, 11 pages of office action and 10 pages of translation available.

Search Report received for corresponding Chinese Patent Application No. 202211213065.5, dated Feb. 13, 2026, 2 pages.

Yu Changgeng, "Intelligent Monitoring Technology and Application of Green Data Center Computer Rooms," Huazhong University of Science and Technology Press, May 2017, pp. 12-13.

* cited by examiner

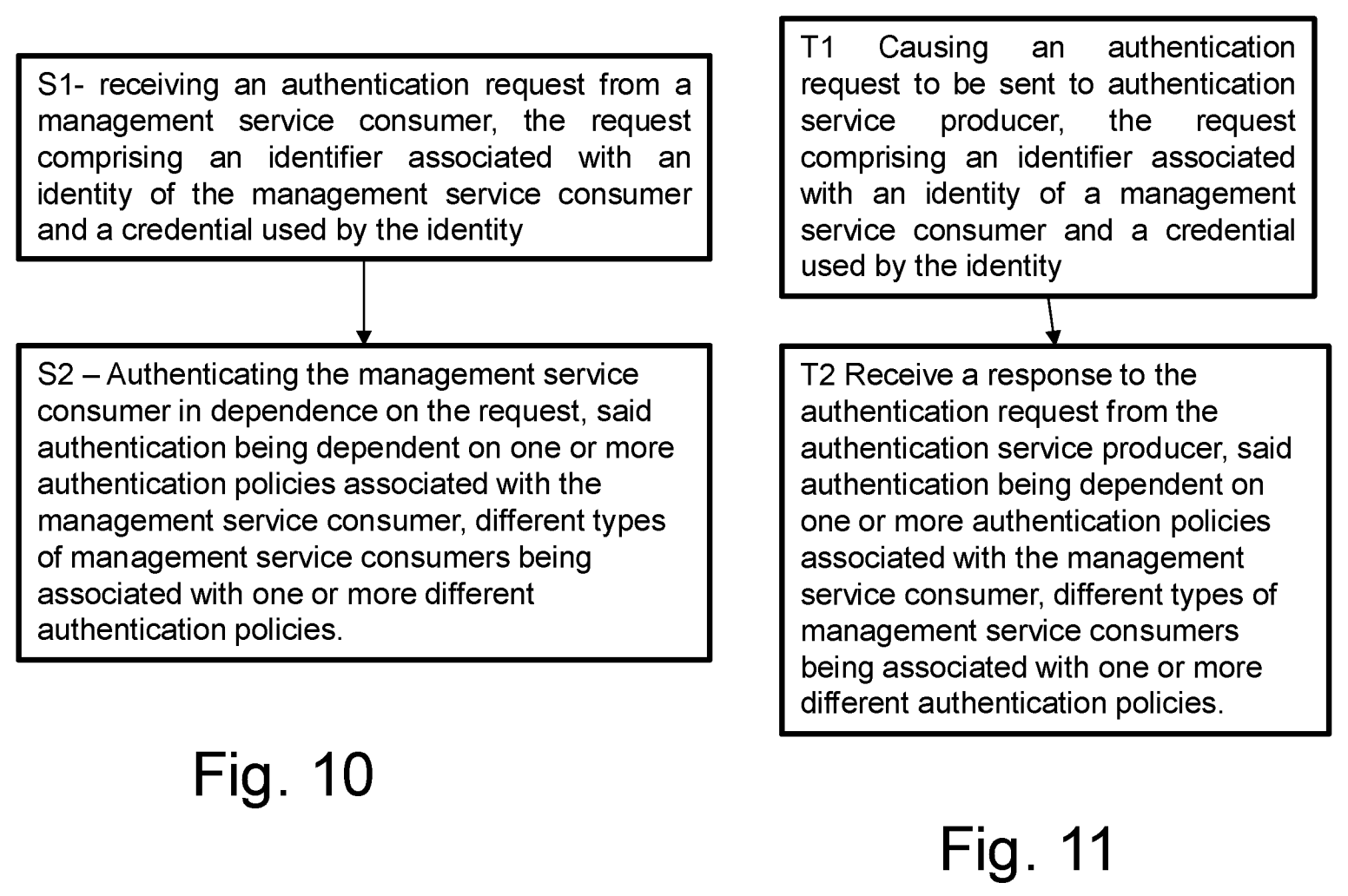

S1- receiving an authentication request from a management service consumer, the request comprising an identifier associated with an identity of the management service consumer and a credential used by the identity S2 – Authenticating the management service consumer in dependence on the request, said authentication being dependent on one or more authentication policies associated with the management service consumer, different types of management service consumers being associated with one or more different authentication policies.

Fig. 10

T1 Causing an authentication request to be sent to authentication service producer, the request comprising an identifier associated with an identity of a management service consumer and a credential used by the identity T2 Receive a response to the authentication request from the authentication service producer, said authentication being dependent on one or more authentication policies associated with the management service consumer, different types of management service consumers being associated with one or more different authentication policies.

Fig. 11

METHOD, APPARATUS, AND COMPUTER PROGRAM

RELATED APPLICATION

This application claims priority to PCT Patent Application No. PCT/CN2021/122439, filed 30 Sep. 2021, which is incorporated herein by reference in its entirety.

FIELD

The present application relates to a method, apparatus, and computer program and in particular but not exclusively a method, apparatus, and computer program relating to authentication in a management service environment.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined.

SUMMARY

According to an aspect, there is provided an apparatus comprising means configured to: receive an authentication request from a management service consumer, the request comprising an identifier associated with an identity of the management service consumer and a credential used by the identity; and authenticate the management service consumer in dependence on the request, said authentication being dependent on one or more authentication policies associated with the management service consumer, different types of management service consumers being associated with one or more different authentication policies.

The request may further comprises one or more of: context information, and information identifying a client or application associated with the management service consumer.

The means may be configured to obtain from a data store information associated with the identifier of the management service consumer and use the obtained information to authenticate the management service consumer.

The means may be configured to cause an update of an authentication status of the management service consumer in response to a successful authentication.

The means may be configured to provide an authentication assertion in response to a successful authentication.

The means may be configured to provide a response to the management service consumer indicating a successful authentication with the authentication assertion.

One or more authentication policies associated with the management service consumer may be provided in the request and/or are stored in a data store.

The means may be configured to: receive an authentication policy request, the authentication policy request comprising information about an authentication policy, the authentication policy request being one of a request to read the authentication policy, a request to create the authentication policy, a request to delete the authentication policy, and a request to update the authentication policy; and one of read, update, create, and delete the authentication policy in dependence on the authentication policy request.

The means may be configured to cause an update to the authentication policy when the authentication policy is updated, created, or deleted.

The information about the authentication policy may comprise at least one or more of: one or more authentication factor, authentication protocol, credential policy, and one or more authentication context parameters.

The authentication policy request may comprise information identifying the authentication policy.

The means may be configured to receive the authentication policy request from an authentication service consumer.

The means may be configured to provide a response comprising information about the authentication policy.

The means may be configured to receive a group request, the request comprising group information about a group of one or more management service entities, the group request being one of a request to read group information, a request to create the group, a request to delete the group, and a request to update the group; and one of read, update, create, and delete information about the group in dependence on the group request.

The management service entities may comprise management service consumers or management service producers.

The means may be configured to cause an update when the group is updated, created, or deleted.

The causing an update may comprise sending an update request to a further entity.

The causing an update may comprise updating a data store.

The group request may comprises information identifying the group.

The means may be configured to provide a group response comprising information about the group.

The group response may comprise one or more identities and/or number of identities associated with the group.

The group information may comprise at least one or more of: a state of the group, a type of the group, an owner of the group, a domain of the group, one or more authentication policies of the group, and a role of the group.

The means may be configured to receive the request from an authentication service consumer.

The means may be configured to: receive an identity request, the request comprising identity information about a management service consumer or a management service producer, the identity request being one of a request to read the identity information, a request to create the identity, a request to delete the identity, and a request to update the identity; and one of read, update, create, and delete information about the identity in dependence on the identity request.

The means may be configured to cause an update when the identity is updated, created, or deleted.

The causing an update comprises sending an update request to a further entity.

The causing an update comprises updating a data store.

The identity request may comprise information identifying the identity.

The means may be configured to provide an identity response comprising information about the identity.

The identity response may comprise an authentication state of the management service consumer or the management service producer.

The identity information may comprise at least one or more of: an identifier of the identity, a type of the identifier, a type of the identity, a state of the identity, a status of the identity, an owner of the identity, a domain of the identity, and a group of the identity.

The means may be configured to associate the identity to one or more default group in response to a create request if no group information is provided in the create request.

The means may be configured to cause updating of one or more groups in data store to add the identity to or delete the identity from an identity list of a respective group in dependence on the request.

The apparatus may be provided in an authentication service producer or be an authentication service producer.

According to another aspect, there is provided an apparatus, the apparatus comprising at least one processor and at least one memory including a computer program code, the at least one memory and computer program code configured to, with the at least one processor, cause the apparatus at least to: receive an authentication request from a management service consumer, the request comprising an identifier associated with an identity of the management service consumer and a credential used by the identity; and authenticate the management service consumer in dependence on the request, said authentication being dependent on one or more authentication policies associated with the management service consumer, different types of management service consumers being associated with one or more different authentication policies.

The request may further comprises one or more of: context information, and information identifying a client or application associated with the management service consumer.

The at least one memory and at least one processor may be configured to cause the apparatus to obtain from a data store information associated with the identifier of the management service consumer and use the obtained information to authenticate the management service consumer.

The at least one memory and at least one processor may be configured to cause the apparatus to cause an update of an authentication status of the management service consumer in response to a successful authentication.

The at least one memory and at least one processor may be configured to cause the apparatus to provide an authentication assertion in response to a successful authentication.

The at least one memory and at least one processor may be configured to cause the apparatus to provide a response to the management service consumer indicating a successful authentication with the authentication assertion.

One or more authentication policies associated with the management service consumer may be provided in the request and/or are stored in a data store.

The at least one memory and at least one processor may be configured to cause the apparatus to: receive an authentication policy request, the authentication policy request comprising information about an authentication policy, the authentication policy request being one of a request to read the authentication policy, a request to create the authentication policy, a request to delete the authentication policy, and a request to update the authentication policy; and one of read, update, create, and delete the authentication policy in dependence on the authentication policy request.

The at least one memory and at least one processor may be configured to cause the apparatus to cause an update to the authentication policy when the authentication policy is updated, created, or deleted.

The information about the authentication policy may comprise at least one or more of: one or more authentication factor, authentication protocol, credential policy, and one or more authentication context parameters.

The authentication policy request may comprise information identifying the authentication policy.

The at least one memory and at least one processor may be configured to cause the apparatus to receive the authentication policy request from an authentication service consumer.

The at least one memory and at least one processor may be configured to cause the apparatus to provide a response comprising information about the authentication policy.

The at least one memory and at least one processor may be configured to cause the apparatus to: receive a group request, the request comprising group information about a group of one or more management service entities, the group request being one of a request to read group information, a request to create the group, a request to delete the group, and a request to update the group; and one of read, update, create, and delete information about the group in dependence on the group request.

The management service entities may comprise management service consumers or management service producers.

The at least one memory and at least one processor may be configured to cause the apparatus to cause an update when the group is updated, created, or deleted.

The causing an update may comprise sending an update request to a further entity.

The causing an update may comprise updating a data store.

The group request may comprises information identifying the group.

The at least one memory and at least one processor may be configured to cause the apparatus to provide a group response comprising information about the group.

The group response may comprise one or more identities and/or number of identities associated with the group.

The group information may comprise at least one or more of: a state of the group, a type of the group, an owner of the group, a domain of the group, one or more authentication policies of the group, and a role of the group.

The at least one memory and at least one processor may be configured to cause the apparatus to receive the request from an authentication service consumer.

The at least one memory and at least one processor may be configured to cause the apparatus to: receive an identity request, the request comprising identity information about a management service consumer or a management service producer, the identity request being one of a request to read the identity information, a request to create the identity, a request to delete the identity, and a request to update the identity; and one of read, update, create, and delete information about the identity in dependence on the identity request.

The at least one memory and at least one processor may be configured to cause the apparatus to cause an update when the identity is updated, created, or deleted.

The causing an update comprises sending an update request to a further entity.

The causing an update comprises updating a data store.

The identity request may comprise information identifying the identity.

The at least one memory and at least one processor may be configured to cause the apparatus to provide an identity response comprising information about the identity.

The identity response may comprise an authentication state of the management service consumer or the management service producer.

The identity information may comprise at least one or more of: an identifier of the identity, a type of the identifier, a type of the identity, a state of the identity, a status of the identity, an owner of the identity, a domain of the identity, and a group of the identity.

The at least one memory and at least one processor may be configured to cause the apparatus to associate the identity to one or more default group in response to a create request if no group information is provided in the create request.

The at least one memory and at least one processor may be configured to cause the apparatus to update of one or more groups in data store to add the identity to or delete the identity from an identity list of a respective group in dependence on the request.

The apparatus may be provided in an authentication service producer or be an authentication service producer.

According to an aspect, there is provided a method comprising: receiving an authentication request, at an authentication service producer, from a management service consumer, the request comprising an identifier associated with an identity of the management service consumer and a credential used by the identity; and authenticating, by the authentication service producer, the management service consumer in dependence on the request, said authentication being dependent on one or more authentication policies associated with the management service consumer, different types of management service consumers being associated with one or more different authentication policies.

The request may further comprises one or more of: context information, and information identifying a client or application associated with the management service consumer.

The method may comprise obtaining, by the authentication service producer, from a data store information associated with the identifier of the management service consumer and use the obtained information to authenticate the management service consumer.

The method may comprise causing, by the authentication service producer, an update of an authentication status of the management service consumer in response to a successful authentication.

The method may comprise providing by the authentication service producer an authentication assertion in response to a successful authentication.

The method may comprise providing by the authentication service producer a response to the management service consumer indicating a successful authentication with the authentication assertion.

One or more authentication policies associated with the management service consumer may be provided in the request and/or are stored in a data store.

The method may comprise: receiving at the authentication service producer, an authentication policy request, the authentication policy request comprising information about an authentication policy, the authentication policy request being one of a request to read the authentication policy, a request to create the authentication policy, a request to delete the authentication policy, and a request to update the authentication policy; and one of reading, updating, creating, and deleting the authentication policy at the authentication service producer in dependence on the authentication policy request.

The method may comprise causing an update to the authentication policy when the authentication policy is updated, created, or deleted.

The information about the authentication policy may comprise at least one or more of: one or more authentication factor, authentication protocol, credential policy, and one or more authentication context parameters.

The authentication policy request may comprise information identifying the authentication policy.

The method may comprise receiving the authentication policy request from an authentication service consumer.

The method may comprise providing a response comprising information about the authentication policy.

The method may comprise: receiving a group request at the authentication service producer, the request comprising group information about a group of one or more management service entities, the group request being one of a request to read group information, a request to create the group, a request to delete the group, and a request to update the group; and one of reading, updating, creating, and deleting information about the group at the authentication service producer in dependence on the group request.

The management service entities may comprise management service consumers or management service producers.

The method may comprise causing an update when the group is updated, created, or deleted.

The causing an update may comprise sending an update request to a further entity.

The causing an update may comprise updating a data store.

The group request may comprises information identifying the group.

The method may comprise providing by the authentication service producer a group response comprising information about the group.

The group response may comprise one or more identities and/or number of identities associated with the group.

The group information may comprise at least one or more of: a state of the group, a type of the group, an owner of the group, a domain of the group, one or more authentication policies of the group, and a role of the group.

The method may comprise receiving the request from an authentication service consumer.

The method may comprise: receiving an identity request at the authentication service producer, the request comprising identity information about a management service consumer or a management service producer, the identity request being one of a request to read the identity information, a request to create the identity, a request to delete the identity, and a request to update the identity; and one of reading, updating, creating, and deleting information about the identity at the authentication service producer in dependence on the identity request.

The method may comprise causing an update when the identity is updated, created, or deleted.

The causing an update comprises sending an update request to a further entity.

The causing an update comprises updating a data store.

The identity request may comprise information identifying the identity.

The method may comprise providing an identity response comprising information about the identity.

The identity response may comprise an authentication state of the management service consumer or the management service producer.

The identity information may comprise at least one or more of: an identifier of the identity, a type of the identifier, a type of the identity, a state of the identity, a status of the identity, an owner of the identity, a domain of the identity, and a group of the identity.

The method may comprise associating the identity to one or more default group in response to a create request if no group information is provided in the create request.

The method may comprise causing updating of one or more groups in data store to add the identity to or delete the identity from an identity list of a respective group in dependence on the request.

The method may be performed by an apparatus. The apparatus may be provided in an authentication service producer or be an authentication service producer.

According to another aspect, there is provided a data store, the data store being configured to store a plurality of different authentication policies and associations between one or more of the different authentication policies and respective management service consumers, different types of management service consumers being associated with one or more different authentication policies.

The data store may be configured to store group information for a plurality of groups, said group information for each group comprising information defining one or more management service consumers belonging to the respective group and one or more authentication policies associated with the respective group.

The data store may be configured to store a plurality of different identities and associations between one or more of the different identities and respective groups, each identity representing a management service consumer or management service producer.

According to another aspect, there is provided an apparatus comprising means configured to: cause an authentication request to be sent to authentication service producer, the request comprising an identifier associated with an identity of a management service consumer and a credential used by the identity; and receive a response to the authentication request from the authentication service producer, said authentication being dependent on one or more authentication policies associated with the management service consumer, different types of management service consumers being associated with one or more different authentication policies.

The request may further comprise one or more of: context information, and information identifying a client or application associated with the management service consumer.

The response may comprise information indicating a successful authentication with an authentication assertion.

One or more authentication policies associated with the management service consumer may be provided in the request.

The apparatus may be provided in a management service consumer or be a management service consumer.

According to another aspect, there is provided an apparatus, the apparatus comprising at least one processor and at least one memory including a computer program code, the at least one memory and computer program code configured to, with the at least one processor, cause the apparatus at least to: cause an authentication request to be sent to authentication service producer, the request comprising an identifier associated with an identity of a management service consumer and a credential used by the identity; and receive a response to the authentication request from the authentication service producer, said authentication being dependent on one or more authentication policies associated with the management service consumer, different types of management service consumers being associated with one or more different authentication policies.

The request may further comprise one or more of: context information, and information identifying a client or application associated with the management service consumer.

The response may comprise information indicating a successful authentication with an authentication assertion.

One or more authentication policies associated with the management service consumer may be provided in the request.

The apparatus may be provided in a management service consumer or be a management service consumer.

According to another aspect, there is provided a method comprising: causing an authentication request to be sent to authentication service producer, the request comprising an identifier associated with an identity of a management service consumer and a credential used by the identity; and receive a response to the authentication request from the authentication service producer, said authentication being dependent on one or more authentication policies associated with the management service consumer, different types of management service consumers being associated with one or more different authentication policies.

The request may further comprise one or more of: context information, and information identifying a client or application associated with the management service consumer.

The response may comprise information indicating a successful authentication with an authentication assertion.

One or more authentication policies associated with the management service consumer may be provided in the request.

The method may be performed by an apparatus. The apparatus may be provided in a management service consumer or be a management service consumer.

According to another aspect, there is provided an apparatus comprising means configured to: receive a request, the request comprising information about an authentication policy, the request being one of a request to read the authentication policy, a request to create the authentication policy, a request to delete the authentication policy, and a request to update the authentication policy; and one of reading, updating, creating, and deleting the authentication policy at the authentication service producer in dependence on the request.

The means may be configured to cause an update when the authentication policy is updated, created, or deleted.

The causing an update comprises sending an update request to a further entity.

The causing an update comprises updating a data store.

The information about the authentication policy may comprises at least one or more of: one or more authentication factor, authentication protocol, credential policy, and one or more authentication context parameters.

The request may comprise information identifying the authentication policy.

The means may be configured to receive the request from an authentication service consumer.

The means may be configured to provide a response comprising information about the authentication policy.

The apparatus may be provided in an authentication service producer or be an authentication service producer.

According to another aspect, there is provided an apparatus, the apparatus comprising at least one processor and at least one memory including a computer program code, the at least one memory and computer program code configured to, with the at least one processor, cause the apparatus at least to: receiving a request, the request comprising information about an authentication policy, the request being one of a request to read the authentication policy, a request to create the authentication policy, a request to delete the authentication policy, and a request to update the authentication policy; and one of reading, updating, creating, and deleting the authentication policy at the authentication service producer in dependence on the request.

The at least one memory and at least one processor may be configured to cause the apparatus to cause an update when the authentication policy is updated, created, or deleted.

The causing an update comprises sending an update request to a further entity.

The causing an update comprises updating a data store.

The information about the authentication policy may comprises at least one or more of: one or more authentication factor, authentication protocol, credential policy, and one or more authentication context parameters.

The request may comprise information identifying the authentication policy.

The at least one memory and at least one processor may be configured to cause the apparatus to receive the request from an authentication service consumer.

The at least one memory and at least one processor may be configured to cause the apparatus to provide a response comprising information about the authentication policy.

The apparatus may be provided in an authentication service producer or be an authentication service producer.

According to another aspect, there is provided a method comprising: receiving a request at a authentication service producer, the request comprising information about an authentication policy, the request being one of a request to read the authentication policy, a request to create the authentication policy, a request to delete the authentication policy, and a request to update the authentication policy; and one of reading, updating, creating, and deleting the authentication policy at the authentication service producer in dependence on the request.

The method may comprise causing an update when the authentication policy is updated, created, or deleted.

The causing an update comprises sending an update request to a further entity.

The causing an update comprises updating a data store.

The information about the authentication policy may comprises at least one or more of: one or more authentication factor, authentication protocol, credential policy, and one or more authentication context parameters.

The request may comprise information identifying the authentication policy.

The method may comprise receiving the request from an authentication service consumer.

The method may comprise providing by the authentication service producer a response comprising information about the authentication policy.

The method may be performed by an apparatus. The apparatus may be provided in an authentication service producer or be an authentication service producer.

According to another aspect, there is provided a method comprising: causing a request to be sent to an authentication service producer, the request comprising information about an authentication policy, the request being one of a request to read the authentication policy, a request to create the authentication policy, a request to delete the authentication policy, and a request to update the authentication policy.

The method may be performed by an apparatus. The apparatus may be provided in an authentication service consumer or be an authentication service consumer.

According to another aspect, there is provided an apparatus comprising means configured to: receive a request, the request comprising group information about a group of one or more management service entities, the request being one of a request to read group information, a request to create the group, a request to delete the group, and a request to update the group; and one of read, update, create, and delete information about the group in dependence on the request.

The management service entities comprise management service consumers or management service producers.

The means may be configured to cause an update when the group is updated, created, or deleted.

The causing an update comprises sending an update request to a further entity.

The causing an update comprises updating a data store.

The request may comprise information identifying the group.

The means may be configured to provide by the authentication service producer a response comprising information about the group.

The response may comprise one or more identities and/or number of identities associated with the group.

The group information may comprise at least one or more of: a state of the group, a type of the group, an owner of the group, a domain of the group, one or more authentication policies of the group, and a role of the group.

The means may be configured to receive the request from an authentication service consumer.

The apparatus may be provided in an authentication service producer or be an authentication service producer.

According to another aspect, there is provided an apparatus, the apparatus comprising at least one processor and at least one memory including a computer program code, the at least one memory and computer program code configured to, with the at least one processor, cause the apparatus at least to: receive a request, the request comprising group information about a group of one or more management service entities, the request being one of a request to read group information, a request to create the group, a request to delete the group, and a request to update the group; and one of reading, updating, creating, and deleting information about the group in dependence on the request.

The management service entities comprise management service consumers or management service producers.

The at least one memory and at least one processor may be configured to cause the apparatus to cause an update when the group is updated, created, or deleted.

The causing an update comprises sending an update request to a further entity.

The causing an update comprises updating a data store.

The request may comprise information identifying the group.

The at least one memory and at least one processor may be configured to cause the apparatus to provide a response comprising information about the group.

The response may comprise one or more identities and/or number of identities associated with the group.

The group information may comprise at least one or more of: a state of the group, a type of the group, an owner of the group, a domain of the group, one or more authentication policies of the group, and a role of the group.

The at least one memory and at least one processor may be configured to cause the apparatus to cause receive the request from an authentication service consumer.

The apparatus may be provided in an authentication service producer or be an authentication service producer.

According to another aspect, there is provided a method comprising: receiving a request at an authentication service producer, the request comprising group information about a group of one or more management service entities, the request being one of a request to read group information, a request to create the group, a request to delete the group, and a request to update the group; and one of reading, updating, creating, and deleting information about the group at the authentication service producer in dependence on the request.

The management service entities comprise management service consumers or management service producers.

The method may comprise causing an update when the group is updated, created, or deleted.

The causing an update comprises sending an update request to a further entity.

The causing an update comprises updating a data store.

The request may comprise information identifying the group.

The method may comprise providing by the authentication service producer a response comprising information about the group.

The response may comprise one or more identities and/or number of identities associated with the group.

The group information may comprise at least one or more of: a state of the group, a type of the group, an owner of the group, a domain of the group, one or more authentication policies of the group, and a role of the group.

The method may comprise receiving the request from an authentication service consumer.

The method may be performed by an apparatus. The apparatus may be provided in an authentication service producer or be an authentication service producer.

According to another aspect, there is provided a method comprising: cause a request to be sent to an authentication service producer, the request comprising group information about a group of one or more management service entities, the request being one of a request to read group information, a request to create the group, a request to delete the group, and a request to update the group.

The method may be performed by an apparatus. The apparatus may be provided in an authentication service consumer or be an authentication service consumer.

According to another aspect, there is provided an apparatus comprising means configured to: receive a request, the request comprising identity information about a management service consumer or a management service producer, the request being one of a request to read the identity information, a request to create the identity, a request to delete the identity, and a request to update the identity; and one of read, update, create, and delete information about the identity in dependence on the request.

The means may be configured to cause an update when the identity is updated, created, or deleted.

The causing an update may comprise sending an update request to a further entity.

The causing an update may comprise updating a data store.

The request may comprise information identifying the identity.

The means may be configured to provide a response comprising information about the identity.

The response may comprise an authentication state of the management service consumer or the management service producer.

The identity information may comprises at least one or more of: an identifier of the identity, a type of the identifier, a type of the identity, a state of the identity, a status of the identity, an owner of the identity, a domain of the identity, and a group of the identity.

The means may be configured to associate the identity to one or more default groups in response to a create request if no group information is provided in the create request.

The means may be configured to cause updating of one or more groups in data store to add the identity to or delete the identity from an identity list of a respective group in dependence on the request.

The apparatus may be provided in an authentication service producer or be an authentication service producer.

According to another aspect, there is provided an apparatus, the apparatus comprising at least one processor and at least one memory including a computer program code, the at least one memory and computer program code configured to, with the at least one processor, cause the apparatus at least to: receive a request, the request comprising identity information about a management service consumer or a management service producer, the request being one of a request to read the identity information, a request to create the identity, a request to delete the identity, and a request to update the identity; and one of read, update, create, and delete information about the identity in dependence on the request.

The at least one memory and at least one processor may be configured to cause the apparatus to cause an update when the identity is updated, created, or deleted.

The causing an update may comprise sending an update request to a further entity.

The causing an update may comprise updating a data store.

The request may comprise information identifying the identity.

The at least one memory and at least one processor may be configured to cause the apparatus to provide by the authentication service producer a response comprising information about the identity.

The response may comprise an authentication state of the management service consumer or the management service producer.

The identity information may comprises at least one or more of: an identifier of the identity, a type of the identifier, a type of the identity, a state of the identity, a status of the identity, an owner of the identity, a domain of the identity, and a group of the identity.

The at least one memory and at least one processor may be configured to cause the apparatus to associate the identity to one or more default group in response to a create request if no group information is provided in the create request.

The at least one memory and at least one processor may be configured to cause the apparatus to cause updating of one or more groups in data store to add the identity to or delete the identity from an identity list of a respective group in dependence on the request.

The apparatus may be provided in an authentication service producer or be an authentication service producer.

According to another aspect, there is provided a method comprising: receiving a request, the request comprising identity information about a management service consumer or a management service producer, the request being one of a request to read the identity information, a request to create the identity, a request to delete the identity, and a request to update the identity; and one of reading, updating, creating, and deleting information about the identity in dependence on the request.

The method may comprise causing an update when the identity is updated, created, or deleted.

The causing an update may comprise sending an update request to a further entity.

The causing an update may comprise updating a data store.

The request may comprise information identifying the identity.

The method may comprise providing by the authentication service producer a response comprising information about the identity.

The response may comprise an authentication state of the management service consumer or the management service producer.

The identity information may comprises at least one or more of: an identifier of the identity, a type of the identifier, a type of the identity, a state of the identity, a status of the identity, an owner of the identity, a domain of the identity, and a group of the identity.

The method may comprise associating the identity to one or more default group in response to a create request if no group information is provided in the create request.

The method may comprise causing updating of one or more groups in data store to add the identity to or delete the identity from an identity list of a respective group in dependence on the request.

The method may be performed by an apparatus. The apparatus may be provided in an authentication service producer or be an authentication service producer.

According to another aspect, there is provided a method comprising: causing a request to be sent to an authentication service producer, the request comprising identity information about a management service consumer or a management service producer, the request being one of a request to read the identity information, a request to create the identity, a request to delete the identity, and a request to update the identity.

The method may be performed by an apparatus. The apparatus may be provided in an authentication service consumer or be an authentication service consumer.

According to another aspect, there is provided a computer readable medium comprising program instructions for causing an apparatus to perform at least the method according to any of the preceding aspects.

According to an aspect, there is provided a non-transitory computer readable medium comprising program instructions for causing an apparatus to perform at least the method according to any of the preceding aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIGS. 10 and 11 show flowcharts of methods performed by an apparatus according to various example embodiments.

DETAILED DESCRIPTION

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
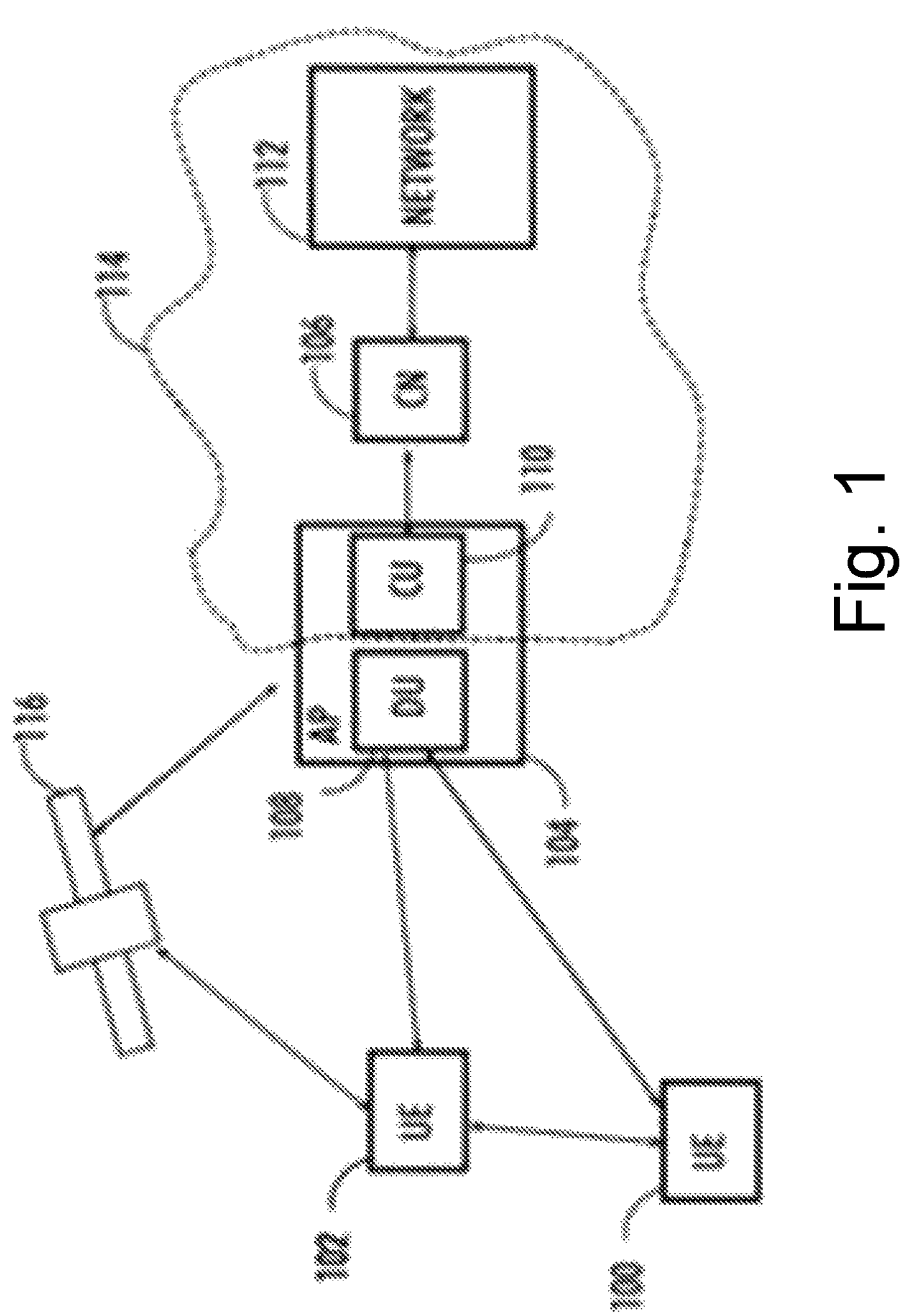
FIG. 1 shows an example system architecture.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 are configured to be in a wireless connection on one or more communication channels with a node 104. The node 104 is further connected to a core network 106. In one example, the node 104 may be an access node such as a base station or (e/g)NodeB serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server, or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC). Depending on the deployed technology, the (e/g)NodeB is connected to a serving and packet data network gateway (S-GW and P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Exemplary embodiments of a device are a subscriber unit, a user device, a user equipment (UE), a user terminal, a terminal device, a mobile station, a mobile device, etc.

The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, a wireless interface card or other wireless interface facility (e.g., USB dongle) and multimedia device. It should be appreciated that a device may also be a nearly exclusive uplink only device, of which an example is a camera or video camera loading images or video clips to a network. The device may be a machine-type communications (MTC) device or an Internet of things (IoT) type communication device. The device may be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones, or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors, and real-time control). 5G is expected to have multiple radio interfaces, e.g. below 6 GHz or above 24 GHZ, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave).

One of the concepts considered to be used in 5G networks is network slicing in which multiple independent and dedicated virtual sub-networks (network instances) may be created within the same infrastructure to run services that have different requirements on latency, reliability, throughput, and mobility. As part of the 5G system, a service management part may be provided. The service management part will be described in more detail later.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets, and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching. Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes, or hosts. Application of cloud RAN architecture enables RAN real time functions being carried out at or close to a remote antenna site (in a distributed unit. DU 108) and non-real time functions being carried out in a centralized manner (in a centralized unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or NodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have access to a plurality of radio cells and the system may comprise also other apparatuses, such as physical layer relay nodes or other network elements, etc. At least one of the (e/g)NodeBs or may be a Home (e/g)NodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometres, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)gNodeBs), a home node B gateway, or HNB-GW (not shown in FIG. 1). A HNB Gateway (HNB-GW), which is typically installed within an operator's network may aggregate traffic from a large number of HNBs back to a core network.

In the following examples, the communications device is referred to as a UE. However, it should be appreciated that the communication device can any suitable communications device, some examples of which have already been mentioned.

Figure 2:
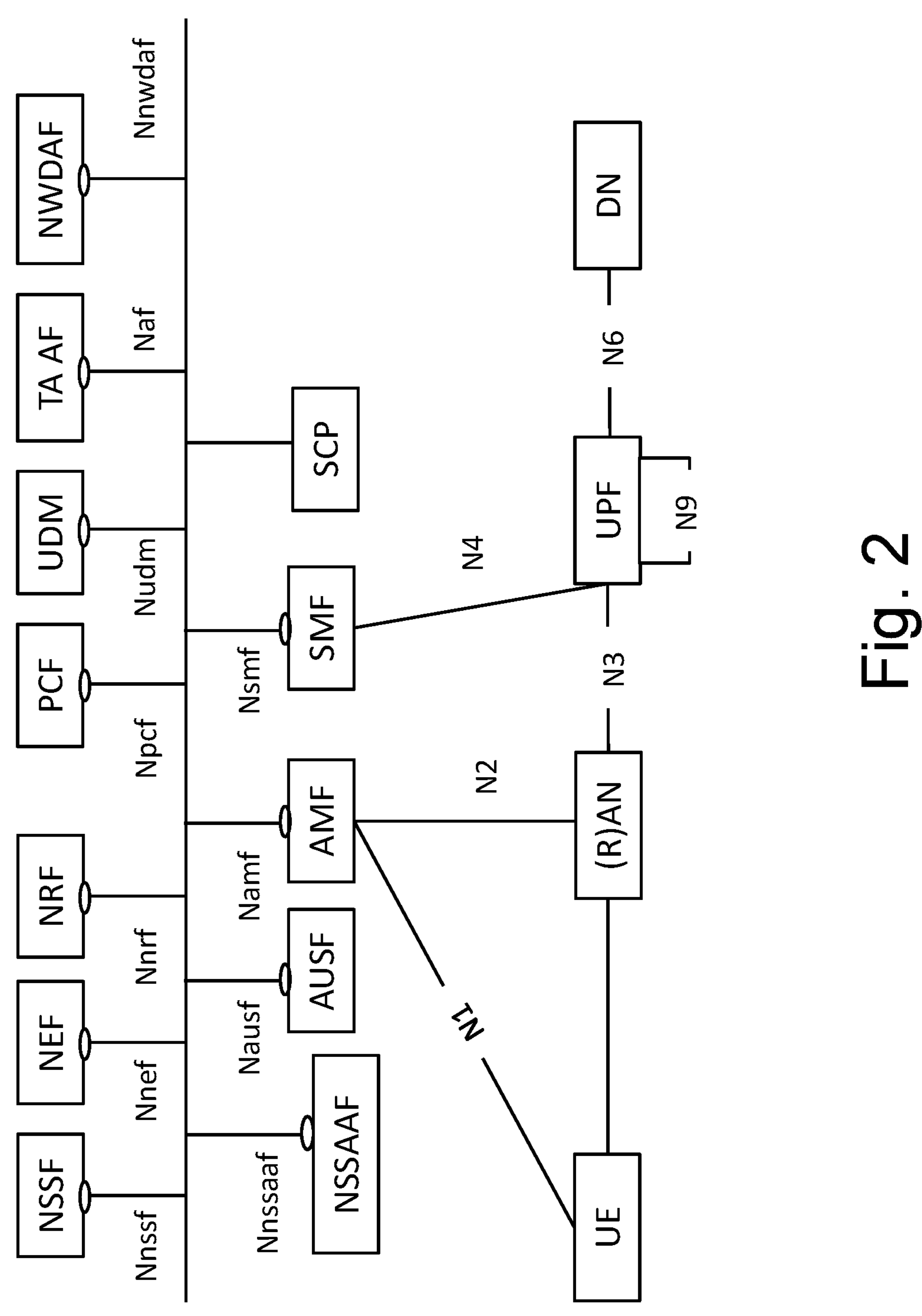
FIG. 2 shows a schematic diagram of an example 5G core network and radio access part.

FIG. 2 shows a schematic representation of part of a 5G system (5GS). The 5GS may be comprised by a terminal or user equipment (UE), a 5G radio access network (5GRAN) or next generation radio access network (NG-RAN), a 5G core network (5GC), one or more application functions (AF) (not shown) and one or more data networks (DN). As will be discussed in more detail later, the 5G system will also have management service part.

The 5G-RAN may comprise one or more base stations. In 5G the base station may be referred to as a gNodeB (gNB). The RAN may comprise one or more gNodeB (gNB) (or base station) distributed unit functions connected to one or more gNodeB (gNB) (or base station) centralized unit functions.

The 5GC may comprise the following entities: one or more access management functions (AMF), one or more session management functions (SMF), an authentication server function (AUSF), a unified data management (UDM), one or more user plane functions (UPF), a service communication proxy (SCP), a policy control function (PCF), a network slice selection function (NSSF), a network slice specific authentication and authorization function (NSSAAF), a network data analytics function (NWDAF), and/or a network exposure function (NEF).

In the example of a 5G system, a management service system is provide in addition to the core network functions, such as shown in FIG. 2. The service based architecture of a management system enables a management service (MnS) consumer to access and utilize capabilities of a MnS producer to provision or monitor logical networks, services, or resources. The management system may be as defined by 3GPP or may be any other suitable management system. An MnS provided by a MnS producer can be consumed by an entity which has the appropriated authorization and authentication.

There may be different MnS consumers or users to access the MnSs. For example, there may be internal and external MnS consumers (which may be machine users), an internal MnS consumer which is acting on behalf of external or internal human users. The MnS consumers and users may be in different management domains. The different MnS consumers may have different capabilities, roles, and security status. The different MnS may be assigned different access control policies.

3GPP TR 28.817 discusses MnS consumers and users. However, it should be appreciated that different embodiments may be used in the context of any other suitable standard.

Currently, 3GPP TR 28.817 defines potential requirements of access control for MnSs, enhances the service based management architecture, and related management services/capabilities to support access control.

Figure 4:
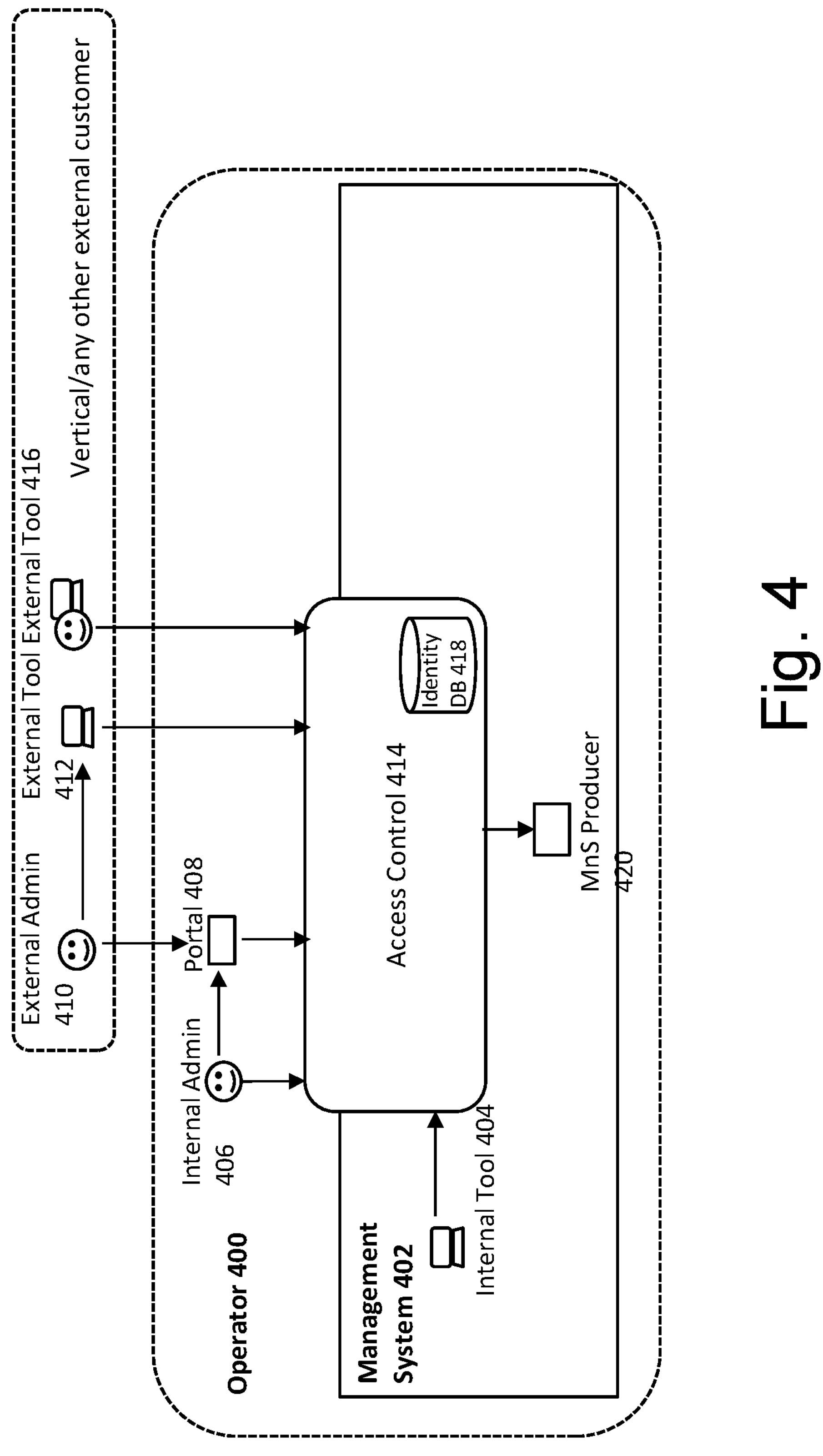
FIG. 4 schematically shows various users/consumers (MnS consumers) of a 3GPP management system in which some embodiments may be provided.

Reference is made to FIG. 4 which schematically shows the various users/consumers (MnS consumers) of a currently proposed 3GPP management system. An operator 400 is provided with a management system 402. The management system may support one or more MnS producers. As shown in FIG. 4, the management services/capabilities of the management system could be exposed to different users/consumers. For example the management system 402 may be exposed to one or more of: an internal tool 404 of the management system; an administrative user 406 and/or portal 408 of the operator (the administrative user 406 may interact with the management system via the portal and/or directly); and one or more users external to the operator. The one or more external users may be external administrative user 410 and/or external portal 412 and/or an external tool 416. The external administrative user 410 may interact with the management system via the external portal and/or a portal of the operator. Access control functionality 414 needs to be provided to prevent unauthorized access of the management system. The access control functionality may comprise an identity database 418. The identity database may store one or more of: external user ID+portal ID, external user ID+external tool ID, external tool ID, internal user ID+portal ID, internal user ID+internal tool ID, internal tool ID, MnS producer ID, and MnS ID.

Some embodiments provide information elements (IEs) in the management protocol to support authentication. Some embodiments provide a new method to interpret and process the IEs. This may provide authentication for a diverse range of MnS consumers. Some embodiments may provide one or more of authentication, authorization, and audit services for MnS access. Some embodiments may provide access control for MnS access.

The IEs may be provided as part of a network resource model (NRM) and operations, Some embodiments may be used in the context of a ZSM (Zero touch network and service management) architecture such as proposed by ETSI or in any other suitable architecture.

ZSM may support the lifecycle management of communication services. This may involve multiple management processes that rely on the interaction between the end-to-end service management domain (E2E SMD) and the one or more management domains that work together to fulfil the communication services. The SMD sits above various domains. The 5G system may be regarded as being made up a "radio domain" and a "core network" domain. Each of the radio domain and the core domain may be associated with a domain management function which sits between the respective domain and the SMD.

Figure 5:
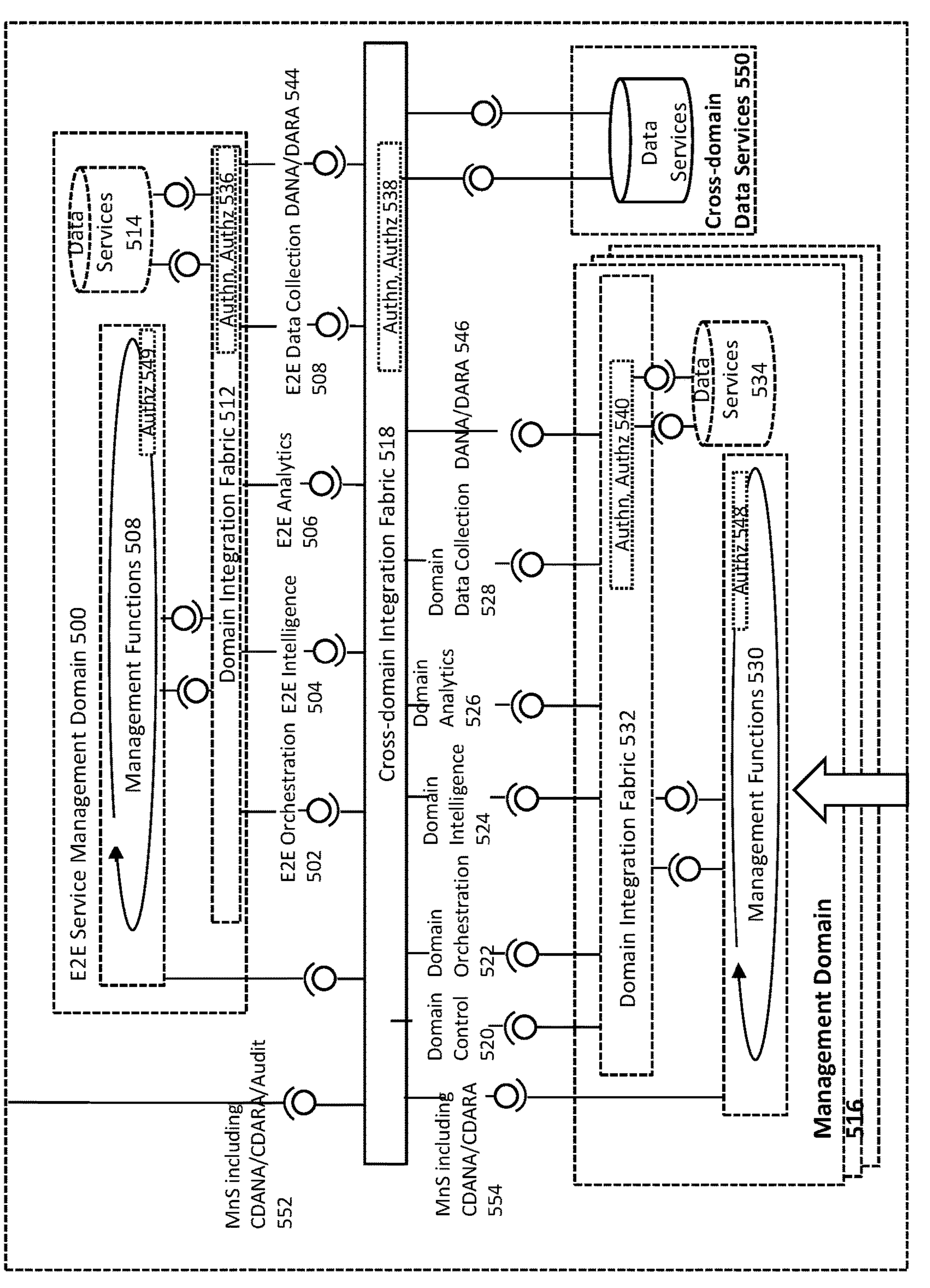
FIG. 5 shows a first example ZSM system in which some embodiments may be provided.

One example ZSM architecture is shown in FIG. 5. The ZSM architecture has an E2E (end to end) service management domain 500. The E2E service management domain may support E2E service orchestration 502, E2E service intelligence 504, E2E analytics 506, E2E data collection 508 and/or the like. The service management domain 500 may comprise management functions 510. The management functions 510 may interact with the support E2E service orchestration 502, E2E service intelligence 504, E2E analytics 506, E2E data collection 508 and/or the like via an integration fabric 512. The service management domain 500 may support data services 514.

A management domain 516 is provided. The management domain 516 interacts with the E2E service management domain 500 via a cross-domain integration fabric 518. The management domain 516 may support management domain control 520, management domain orchestration 522, management domain intelligence 524, management domain analytics 526, and management domain data collection 528. The management domain may comprise management functions 530. The management functions 530 may interact with the management domain control 520, management domain orchestration 522, management domain intelligence 524, management domain analytics 526, and management domain data collection 528 via management domain integration fabric 532. The management domain 516 may support data services 534.

There are various use cases proposed for access control on ZSM framework. These use cases may include one which cross multiple management domains. The ZSM framework may support access control inside or across domain(s). Two options have been proposed to the ZSM framework to support access control.

FIG. 5 shows a first option. In this option, the authentication/authorization administration services and audit service are provided by integration fabric. In the example shown in FIG. 5, authentication/authorization functionality 536 is provided in the domain integration fabric 512 of the E2E service management domain 500, authentication/authorization functionality 538 is provided in the cross domain integration fabric 518, and authentication/authorization functionality 540 is provided in the domain integration fabric 532 of the management domain 516. Authorization functionality 549 is provided in the management function 508 of the E2E service domain 500. Authorization functionality 548 is provided in the management function 530 of the management domain 516. Cross-domain data services 550 are provided to and/or by the cross-domain integration fabric 518.

Cross-Domain/Domain Authentication Administration (CDANA/DANA) service, Cross-Domain/Domain Authorization Administration service (CDARA/DARA) and Audit services are provided by cross domain/domain integration fabric. As referenced 552, a MnS, which may support CDANA/CDARA/audit is provided by the cross domain integration fabric. This may be for external MnS consumers/producers. As referenced 554, a MnS, which may support CDANA/CDARA is provided by the cross domain integration fabric to the management domain 516. The management domain 516 may support DANA and DARA services 550. The E2E service management domain 516 may support DANA and DARA services 544.

An audit service is provided by cross-domain integration fabric.

Authentication enforcement (validate identity and credentials, and return token/assertion) are provided by the integration fabric.

Authorization enforcement (validate the token and return allowed services) is provided by either the integration fabric (in proxy case) or management function as MnS producer (in direct access case).

Figure 6:
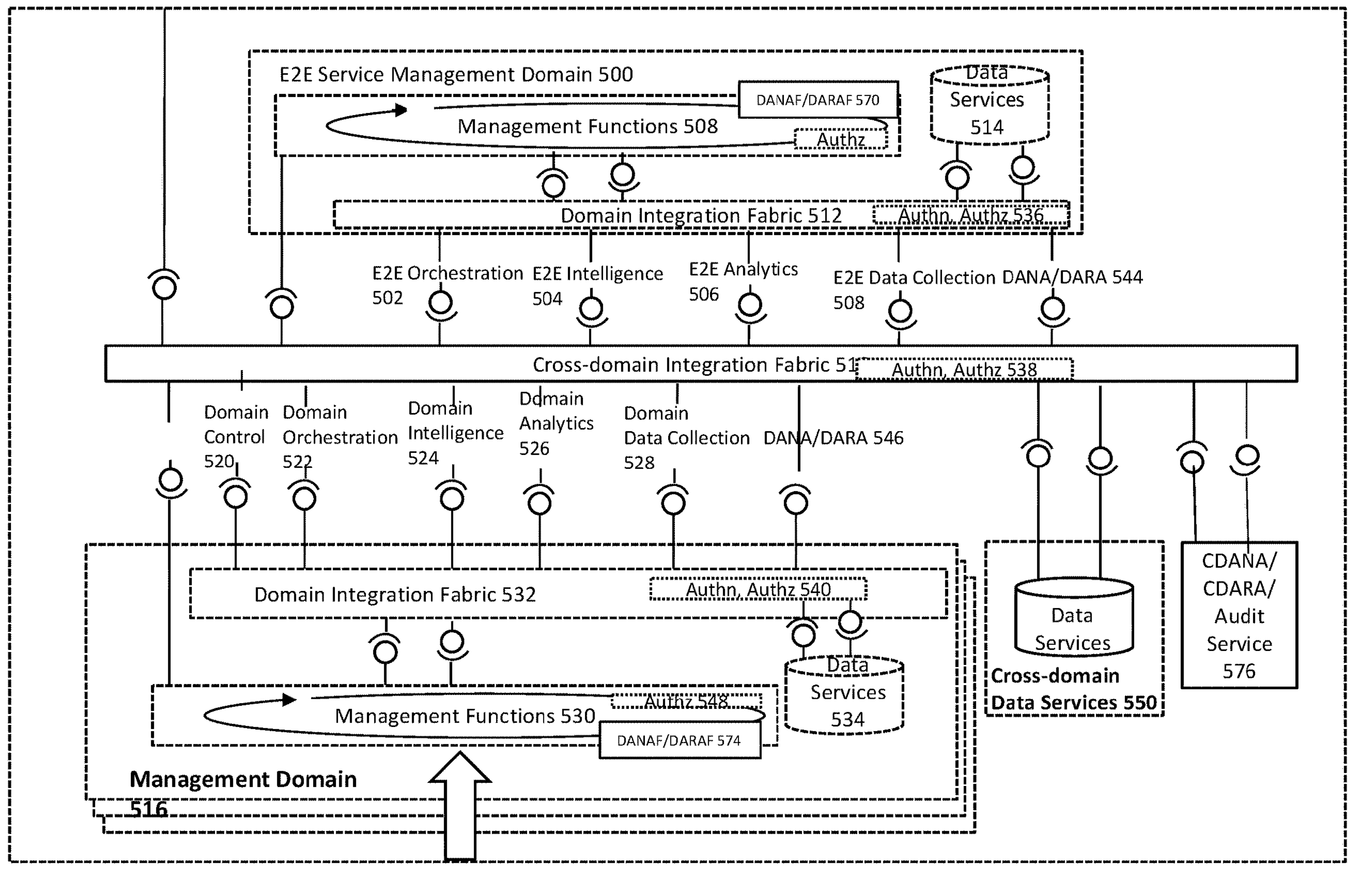
FIG. 6 shows a second example ZSM system in which some embodiments may be provided.

The second option is shown in in FIG. 6. Those parts which are the same as in FIG. 5 are referenced with the same reference numbers and are not described again. In this second option, cross-domain authentication/authorization administration services and audit service are provided by a dedicated AAA service producer, and domain authentication/authorization administration services are provided by domain management function.

Cross-Domain Authentication Administration (CDANA) service, cross-domain authorization administration service (CDARA) and Audit service are provided by dedicated producer, referenced 576. The CDANA/CDARA/audit is thus provided by a dedicated management function 576 and not the cross-domain integration fabric. The items referenced 552 and 554 in FIG. 5 are omitted from FIG. 6.

The domain authentication administration (DANA) service and domain authorization administration service (DARA) are provided by domain management function. Thus the management function 508 of the E2E service management domain is provided with a DANA function/DARA function (DANAF/DARAF) 570. The management function 530 of the management domain is provided with a DANAF/DARAF 574.

Authentication enforcement (validate identity and credentials, and return token/assertion) are provided by the integration fabric.

Authorization enforcement (validate the token and return allowed services) is provided by either the integration fabric (in proxy case) or management function as MnS producer (in direct access case).

Some embodiments may provide information elements (IEs) of the management protocol to support authentication. Some embodiments may provide a method to interpret and process the IEs to implement authentication. This may for example, be in the context of the example ZSM architectures or any other suitable architectures.

It has been proposed in the context of the 3GPP management domain to enhance the service based management architecture (SBMA), request-response communication paradigm and network resource model to support authentication, authorization, and audit capabilities. This is for example proposed in the context 3GPP TR 28.817.

Figures 7A, 7B:
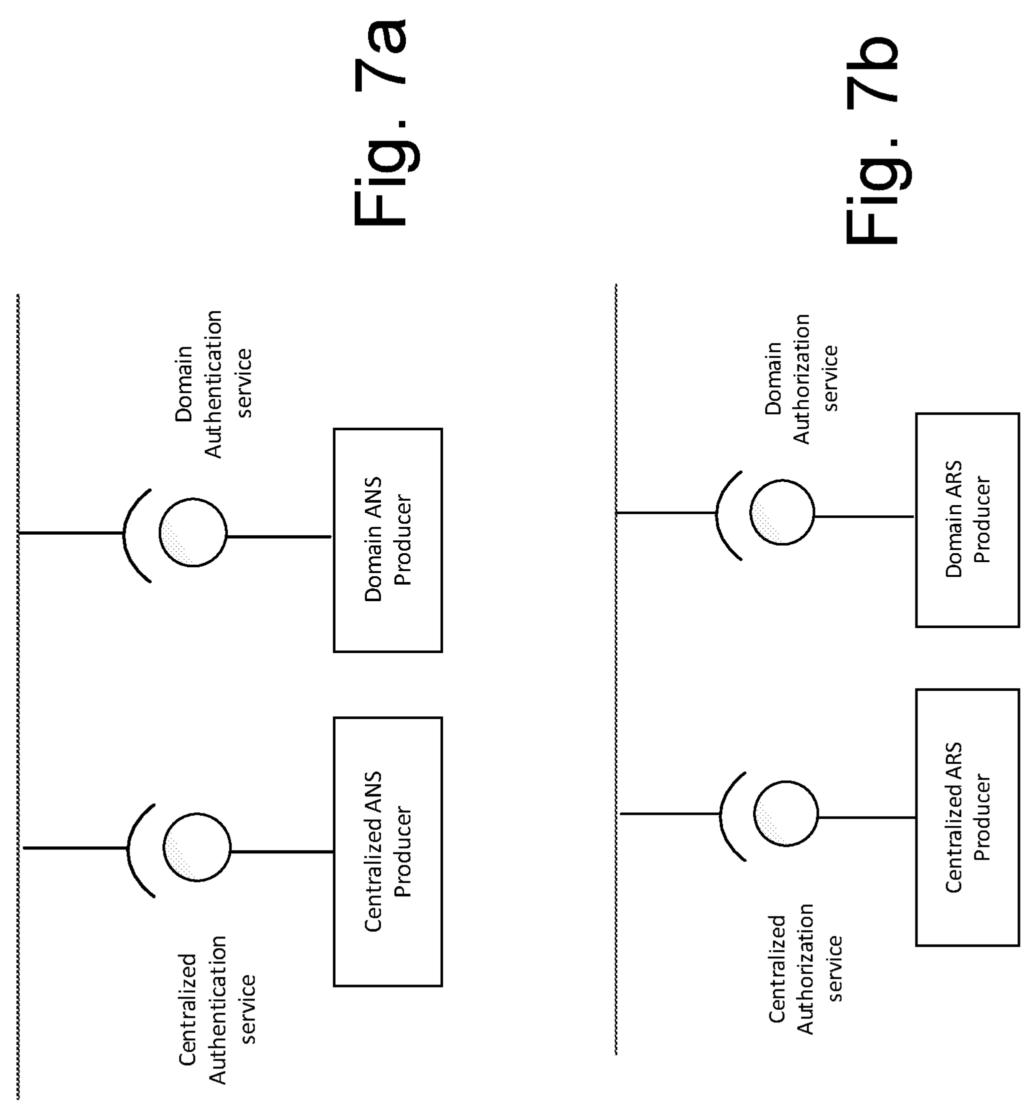
FIG. 7*a* shows an authentication capability of a service based architecture.
FIG. 7*b* which shows an authorization capability of a service based architecture.

The requirements and architecture enhancement proposal in 3GPP are generally as in ZSM proposals but in the context of the 3GPP management domain. Reference is made to FIG. 7*a* which shows an authentication capability of a service based architecture. An authentication service ANS is provided. A shown schematically in FIG. 7*a*, an ANS producer can be deployed at different levels, for example, at a domain level (e.g. in RAN, CN, domain) to support access control between MnS consumer and producer inside the same domain, and/or in a centralized manner (e.g. at a PLMN level) to support access control between MnS consumer and producer from different domains.

Reference is made to FIG. 7*b* which shows an authorization capability of a service based architecture. An authorization service ARS is provided. A shown schematically in FIG. 7*b*, an ARS producer can be deployed at different levels, for example, at a domain level (e.g. in RAN, CN, domain) to support access control between MnS consumer and producer inside the same domain, and/or in a centralized manner (e.g. at a PLMN level) to support access control between MnS consumer and producer from different domains.

Figure 7C:
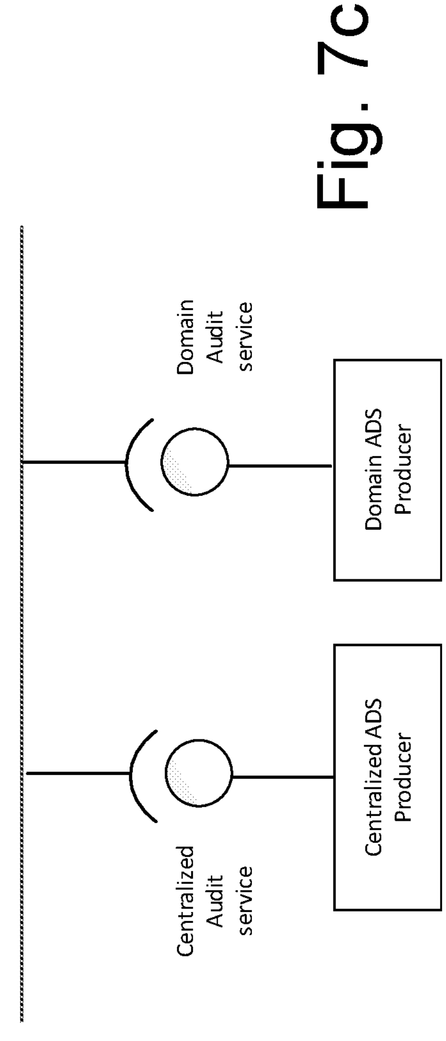
FIG. 7*c* which shows an audit capability of a service based architecture.

Reference is made to FIG. 7*c* which shows an audit capability of a service based architecture. An audit service ADS is provided. A shown schematically in FIG. 7*c*, an ADS producer can be deployed at different levels, for example, at a domain level (e.g. in RAN, CN, domain) to support log collection and audit for a specific domain, and/or in a centralized manner (e.g. at a PLMN level) to support log collection for different domains.

Figure 8:
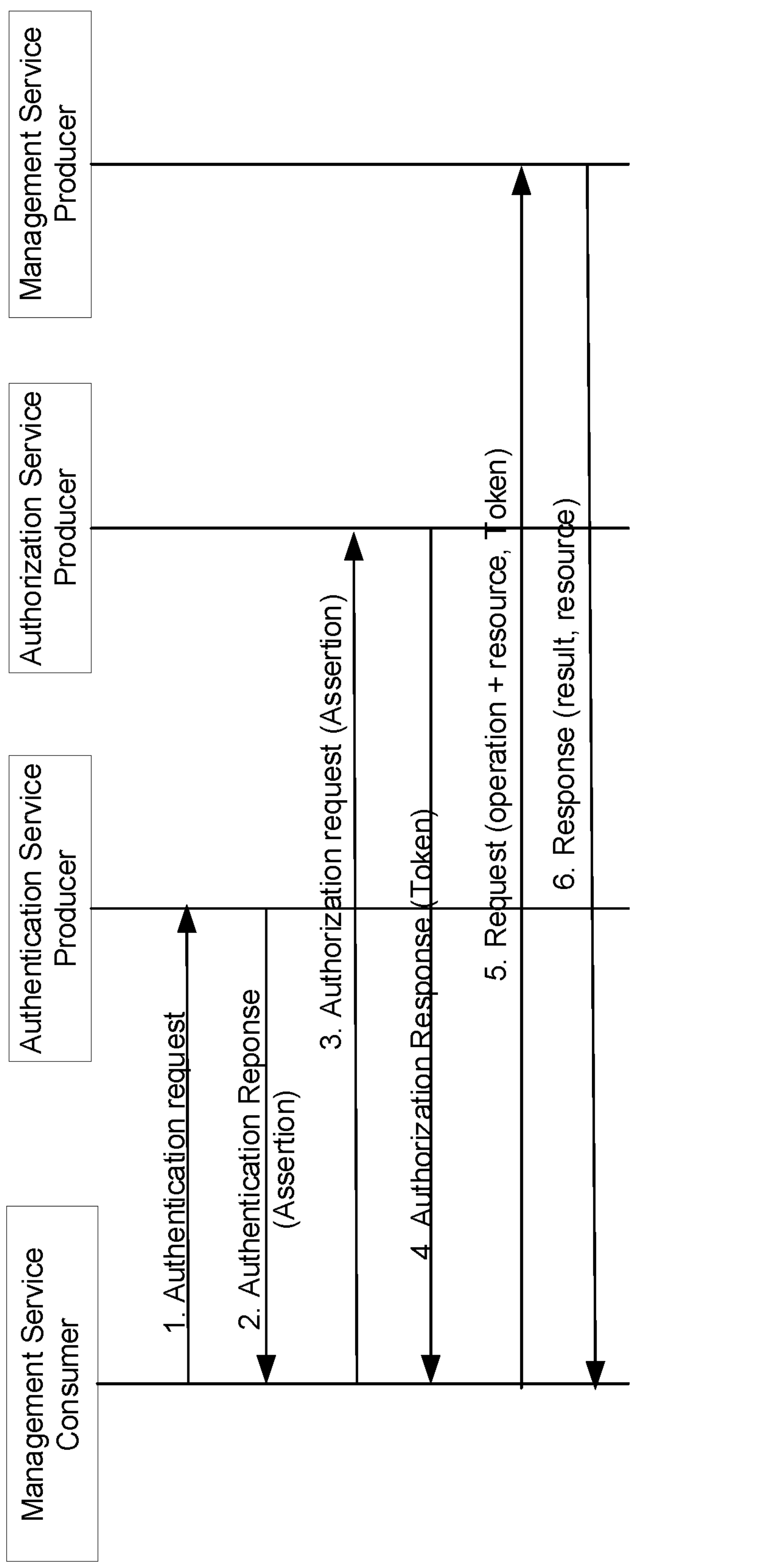
FIG. 8 shows a request-response communication paradigm with access control.

Reference is made to FIG. 8 which shows a request-response communication paradigm with access control.

There are two preconditions:

The MnS consumer and producer are configured in authentication and authorization service producer. The MnS consumer is assigned for a specific role in a specific group.

The permissions for specific role or group are configured in the authorization service producer.

The procedures are as follows:

As referenced 1, the MnS consumer logs on to authentication service producer for authentication. The MnS consumer thus sends an authentication request to the authentication service producer.

As referenced 2, the authentication service producer returns authentication assertion to the MnS consumer once it has successfully authenticate the MnS consumer. Thus the authentication service producer sends an authentication response to the MnS consumer. This comprises the authentication assertion.

As referenced 3, with the authentication assertion, the MnS consumer asks permissions from authorization service producer. The MnS consumer sends an authorization request to the authorization service producer. This comprises the authentication assertion.

As referenced 4, the authorization service producer validates the assertion, checks the role/group of the MnS consumer and assigns related permissions to the MnS consumer. The authorization service producer constructs an access token based on granted permissions and sends back the token to the MnS consumer. The token includes privilege/permissions assigned to an MnS consumer after the MnS consumer authenticity is asserted. This is provided in an authorization response.

| Attributes | Support | Cardinality | Description |
|---|---|---|---|
| token ID | M | 1 | The identification of the token |
| Validity | M | 1 | The time-based validity of the token, beyond which the token will be considered invalid. |
| authorizedMnS | M | 1 . . . * | List of management services and its capabilities the consumer is authorized to access. |
| MnS Type, Label, Version | O | 0 . . . 1 | Type of MnS (PROVISIONING, FAULT_SUPERVISION, PERFORMANCE_ ASSURANCE), Label: human readable description, Version: version of the MnS |

-continued

| Attributes | Support | Cardinality | Description |
|---|---|---|---|
| allowedComponentA | M | 1 . . . * | The list of operation of the MnS, consumer is authorized to access. This will be the {MnSRoot} in case of OpenAPI implementations |
| allowedComponentB | M | 1 . . . * | The list of IOC the consumer can access. |
| uri | M | 1 | The URI of the NRM fragment (IOC) |
| allowedAttr | M | 1 . . . N | The list of attributes permission present in the IOC |
| attName | M | 1 | Attribute name present in the IOC |
| attPermission | M | 1 | The type of permission (Readonly, Writeable) |
| allowedComponentC | O | 0 . . . 1 | The list of performance measurement and the KPI, the consumer is authorized to collect. |
| allowedMeasurement | M | 1 . . . * | List of authorized measurements |
| managedEntity | M | 1 | Managed entity producing the measurement |
| perfMeasurement | M | 1 | Measurement the consumer is authorized to collect. |
| allowedKPI | M | 1 . . . * | List of authorized KPI |
| allowedAlarmInfo | O | 1 . . . * | List of alarm info the consumer is authorized to receive |
| managedEntityAlarmInfo | M | 1 | Alarm info |
| allowedNotifications | M | 1 . . . * | The url of the notification which consumer is authorized to subscribe for. |

Notes: The table above is an example. Different embodiments may have a different structure for the token.

As referenced 5, the MnS consumer checks the access token, construct a service request based on permissions in the token, and sends the service request, including access token, to the MnS producer.

As referenced 6, the MnS producer validates the access token, performs the request and returns result to the MnS consumer.

New management services (MnSs) to support authentication, authorization and audit are proposed as extensions of SBMA and general MnS request/response workflow to include authentication and authorization. Some embodiments may enhance the interfaces/protocols, and/or interactions between the MnS producer, MnS consumer and authentication service producer to support authentication and authorization. Some embodiments may introduce information elements (IEs) of the management protocol to support identity management, authentication. Some embodiments may provide a method to interpret and process the IEs to implement authentication for diverse MnS consumers.

Currently, the Authentication and authorization solutions defined in SA3 and CT for service based architecture (SBA) of 5G core network or for Common API Framework (CAPIF) only consider "machine" consumer/user of the NF services. However, as shown in FIG. 4, the "human consumer", or "machine consumer" on behalf of a human user needs to be supported. Thus some embodiments adapt the protocol and data model to support identity management, authentication and authorization to support this type of complexity and uncertainty. Some embodiments may address this issue by providing new information elements (IEs) of the management protocol and/or a method to provide authentication for different types of consumers, including internal and external human consumers, internal and external machine consumer which could be e.g. AI/ML (artificial intelligence/machine learning) based analytics function, monitoring and provisioning management function, and/or the like.

Some embodiments provide methods to support the authentication of an MnS consumer. This may be in the management system. The management system may be a 3GPP management system.

Some embodiments may provide an interface and/or method to create, read, update and delete the identity of an MnS consumer or producer.

Some embodiments may provide an interface and/or method to create, read, update and delete a group of MnS consumers/producers.

Some embodiments may provide an interface and/or method to create, read, update and delete authentication policy.

Some embodiments may provide an interface to support authentication procedures for diverse users based on different authentication policies assigned to the different users.

Some embodiments may provide IEs and protocol enhancement. Some embodiments may provide updated procedures for one or more the following 3GPP standards: TS 28.622, 28.623 and 28.532. However, it should be appreciated that other embodiments may be used with other standards and specifications.

The methods may be implemented by one or more management functions or management service producers.

Figure 9:
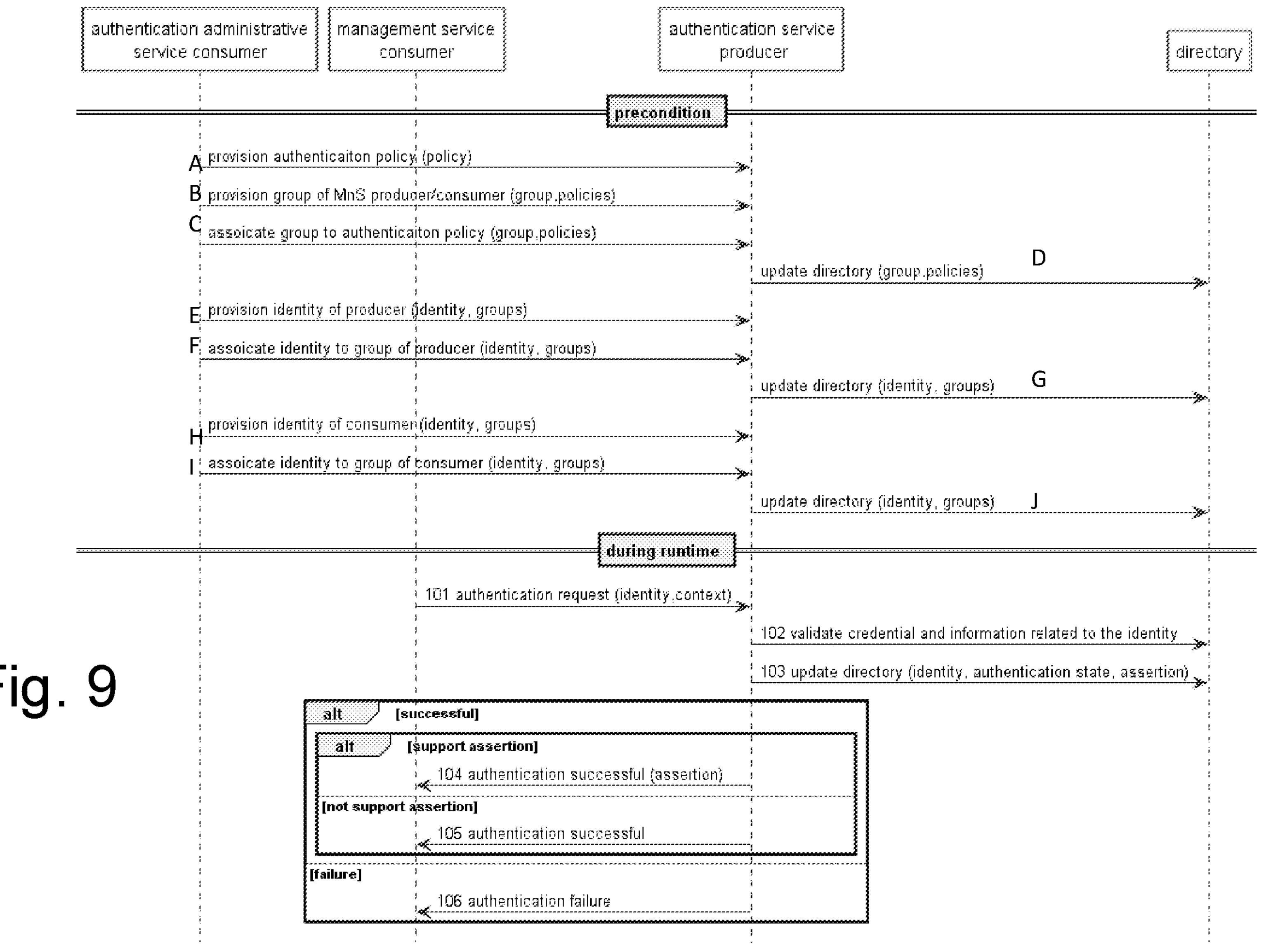
FIG. 9 shows a method flow of some embodiments.

Reference is made to FIG. 9 which shows a method of some embodiments.

There are the following preconditions:

As referenced A, the authentication administrative service consumer sends an authentication policy provisioning request to the authentication service producer. The authentication service producer creates/updates/deletes an authentication policy on receiving the policy provisioning request. This request may relate to one or more authentication policies relating to one or more management service consumers/producers.

As referenced B, the authentication administrative service consumer sends a group provisioning request to the authentication service producer. The group is a list/set of MnS producers/consumers. The authentication service producer creates/updates/deletes a group of MnS producers/consumers on receiving group provisioning request. The authentication service producer may associate the group to authentication policies if the policies are in the request, otherwise the producer may assign default policies to the group. This request may relate to one or more groups.

Alternatively, the authentication service producer associates the group to one or more authentication policies when receiving a further request to update the group. In this example, referenced C, the authentication administrative service consumer sends a request to associate the group to the authentication policies.

It should be noted that C may be optionally in some embodiments. In other embodiments, the sequence of the above procedures A to C may take place in a different order to that shown in FIG. 9.

As referenced D, the authentication service producer updates a data store with the group and policies information. The data store may record identity, group, policy information and their associations. The data store may be a database or directory. It should be appreciated that the update may be performed after procedure A, after procedure B and after procedure C (if performed) instead of only after procedures A to C have been completed.

As referenced E, the authentication administrative service consumer sends an identity provisioning request to the authentication service producer. The authentication service producer creates/updates/deletes an identity of the producer in response to received identity provisioning request. The authentication service producer may associate the identity to group(s) if group information is in the request. Otherwise the authentication service producer associates the identity to a default/preconfigured groups according to one or more of type, domain, organization, and/or the like in the identity information. This request may relate to one or more management service producers.

Alternatively, the authentication service producer associates the identity to group(s) in response to receiving from the authentication administrative service consumer a further request to update the identity. This is referenced F.

Further, the authentication service producer may update corresponding group(s) to reflect the provisioned identity associated to the group(s).

It should be appreciated that the sequence of above procedures could be different. For procedures E and/or F may be performed before, after or in between procedure A to C (which can be performed in any order.

As referenced G, the authentication service producer updates the directory with the identity and group(s) information. It should be appreciated that the update may be performed after procedure E, and after procedure F (if performed) instead of only after procedures E and F have been completed.

As referenced H, the authentication administrative service consumer sends an identity provisioning request to the authentication service producer. The authentication service producer creates/updates/deletes an identity of the consumer in response to received identity provisioning request. The authentication service producer may associate the identity to group(s) if group information is in the request. Otherwise the authentication service producer associates the identity to a default/preconfigured groups according to one or more of type, domain, organization, and/or the like in the identity information. This request may relate to one or more management service consumers.

Alternatively, the authentication service producer associates the identity to group(s) in response to receiving from the authentication administrative service consumer a further request to update the identity. This is referenced I.

It should be appreciated that the sequence of above procedures could be different. Procedures H and/or I may be performed before, after or in between procedure A to C (which can be performed in any order). For procedures H and/or I may be performed before, after or in between procedure E and F (if performed).

As referenced J, the authentication service producer updates the directory with the identity and group(s) information. It should be appreciated that the update may be performed after procedure H, and after procedure I (if performed) instead of only after procedures H and I have been completed.

In some embodiments, one or more of the updates of procedures D, G and J may consolidated.

In some embodiments, the authentication service producer updates the directory. In other embodiments, the authentication service producer may sent an update request to another entity. That entity may update the directory.

The directory or data store may have three types of managed objects maintained in the data store. One of these managed objects may be identity which represents either a management service consumer or a management service producer. An identity is assigned to one or more group(s) which is another managed object. Each group may have one or more identity members. A group is associated to one or more authentication policies which are the third managed object.

The MnS consumer successfully authenticated the authentication server. These preconditions mean that the MnS consumer already validated the authenticity of the authentication service producer, the following procedures will describe how the authentication service produce validate/authenticate the MnS consumer. Before authenticating to the authentication service producer and getting authentication assertion from the authentication service producer, the MnS consumer need to confirm the authentication service producer is valid/legal entity.

In some embodiments, there may be a precondition that a mutual authentication between authentication administrative service consumer and authentication service producer has been done/performed.

One or more of these preconditions may be omitted. There may alternatively or additionally be one or more other preconditions.

The following procedures may be performed during run time.

As referenced 101, the management service consumer provides an authentication request to the authentication service producer. In response to receiving the authentication request, the authentication service producer gets the identifier and credential of the MnS consumer. Optionally the authentication service producer obtains other context information (e.g. the address of the client) from the request.

As referenced 102, the authentication service producer gets, based on identifier in the request, identity information. The identity information may comprise e.g. status of the identity, associated group(s) of the identity, credential of the identity and or the like. The identity information may be obtained from the directory. The authentication service producer authenticates the MnS consumer by validating one or more or both of the identity information and other context information according to one or more corresponding authentication policies associated with the one or more group(s) to which the MnS consumer belongs to. The other context information may be for example time and/or location of the consumer). The authentication policies may comprise one or more of authentication factor, protocol, supported time, location, status of the consumer, and/or the like.

As referenced 103, the authentication service producer updates the authentication status of the MnS consumer in the directory after authenticating the MnS consumer. If the MnS consumer is authenticated successfully and authentication assertion is supported by the protocol, the authentication service producer constructs an authentication assertion and may update the assertion of the MnS consumer in the directory. Authentication assertion means that the assertion subject, that this the MnS consumer, was authenticated by a particular means, that is the authentication service producer, at a particular time.

As referenced 104, if the authentication was successful and authentication assertion is supported by the protocol, the authentication service producer sends a successful response with assertion to the management service consumer.

As referenced 105, if the authentication was successful and authentication assertion is not supported by the protocol, the authentication service producer sends a successful response without assertion to the management service consumer. This is thus an alternative to the procedure referenced 104.

As referenced 106, if the authentication failed, the authentication service producer sends the failure response to the consumer.

For the providing of an authentication policy, the following input parameters may be provided. This may be as part of a CRUD (create, read, update, delete) operation.

These input parameters may be provided in the authentication policy provisioning request from the authentication administrative consumer:

| Parameter | Data type | P | Cardinality | Description |
|---|---|---|---|---|
| id | DN (distinguish name) | CM | 1 | It uniquely identifies a PolicyInfo MOI Managed object instance. (The MOI represents an object managed in the management system. The id is used to identify this MOI). It's in read, update and delete request, may be in create request also. |
| policy | String | CM | 1 | The policy to be created/read/updated/deleted. The policy could be, e.g. authentication factor(s), authentication protocol, credential policy, authentication context (e.g. time, location, identity status, etc.) It could be in a create, update and read request |

The output parameters may be provided in a response to the authentication policy provisioning request. These output parameters may be the same as corresponding input parameters: This response may be provided to the source of the request.

| Parameter | Data type | P | Cardinality | Description |
|---|---|---|---|---|
| id | DN | M | 1 | It is in all the provisioning responses. |
| policy | String | CM | 1 | It is in create, update and read response. |

The input parameters for a CRUD operation for providing a group of MnS producers/consumers are below These input parameters may be provided in the group provisioning request from the authentication administrative consumer:

| Parameter | Data type | P | Cardinality | Description |
|---|---|---|---|---|
| id | DN | CM | 1 | It uniquely identifies a GroupInfo MOI. It is in a read, update and delete request, may be in a create request also |
| result | ENUM | M | 1 | Result of provisioning-that is to create, read, update or delete a group depending on the request, it could be successful, fail, etc. |
| group | GroupInfo | CM | | 1 Group to be created/read/updated/deleted. It is in create, read, update request. |

Where the data type is GroupInfo—group information, the data type may be as set out below. It should be appreciated that this is by way of example and one or more of the attributes may not be provided and/or one or more additional attributes may be provided.

| Attribute | Data type | P | Cardinality | Description |
|---|---|---|---|---|
| groupState | ENUM | CM | 1 | The state of the group, e.g., it could be active or inactive It could be in create, update and read request. |
| groupType | ENUM | CM | 1 | The type of the group, e.g., it could be group of human consumers, group of machine consumers, group of MnS producers, etc. It could be in a create, update and read request. |
| groupOwner | String | O | 1 | The owner of the group, e.g., it could be an operator, organization of an operator, vertical customer/tenant. It could be in a create, update and read request. |
| groupDomain | DN | O | 1 | The domain of a group of management functions as MnS producer/consumer, e.g., E2E domain, core domain, RAN domain, etc. It could be in a create, update and read request. |
| authPolicy | DN | CM | 1..N | The authentication policies assigned to a group, its list of DN (domain names) of authentication policy MOI. It could be in a create, update and read request. |
| role | DN | CM | 1..N | Roles assigned to a group of MnS consumer, e.g., administrator of the resource owner, common operator of the resource owner, management function in same domain, management function in trusted domain, management function in untrusted domain, administrator of trusted/untrusted 3rd party, operator of trusted/untrusted 3rd party, etc. Note: role definition can be more granular, e.g., based on trust level, functionality, SLA (service level agreement), etc. It could be in a create, update and read request. |

The output parameters for a CRUD operation for providing of the identity of the MnS producer/consumer are below: The attributes relation to the group identity information may be as set out in the previous table. These output parameters may be provided in response to the group provisioning request from the authentication administrative consumer. This response may be provided to the source of the request.

| Attribute | Data type | P | Cardinality | Description |
|---|---|---|---|---|
| id | DN | M | 1 | It is in all responses. |
| result | ENUM | M | 1 | Result of provisioning (that is was the request successfully carried out). The result may be successful, fail, etc. |
| groupState | ENUM | CM | 1 | It could be in a create, update and read response. |
| noOfMembers | Integer | O | 1 | Number of identities in the group. It is in a read response. |
| groupType | ENUM | CM | 1 | It could be in a create, update and read response. |

-continued

| Attribute | Data type | P | Cardinality | Description |
|---|---|---|---|---|
| groupOwner | String | O | 1 | It could be in create, update and read response. |
| groupDomain | DN | O | 1 | It could be in a create, update and read response. |
| authPolicy | DN | CM | 1..N | It could be in a create, update and read response. |
| role | DN | CM | 1..N | It could be in a create, update and read response. |
| identityList | DN | O | 1..N | list of associated identities. It could be in a read response |

The input parameters for a CRUD operation for providing of the identity of the MnS producer/consumer are below: These input parameters may be provided in the authentication policy provisioning request from the authentication administrative consumer:

| Parameter | Data type | P | Cardinality | Description |
|---|---|---|---|---|
| id | DN | CM | 1 | It uniquely identifies a IdentityInfo MOI. It is in read, update and delete request, may be in a create request also |
| identity | IdentityInfo | CM | 1 | Identity to be created/read/updated/deleted. It is in create, read, and update request. |

Where the data type is IdentityInfo, the data type may be as set out below:

| Attribute | Data type | P | Cardinality | Description |
|---|---|---|---|---|
| identifier | String | CM | 1 | A readable string to uniquely represent an identity, e.g. an email address, a username, etc. It is in a create request, could be in an update, read and delete request also. |
| identifierType | ENUM | CM | 1 | Type of identifier, e.g. email address, IP address, username, etc. It is in a create request, could be in an update, and read request also. |
| identityType | ENUM | CM | 1 | The type of an identity, e.g., it could be group of human consumers, group of machine consumers, group of MnS producers, etc. It could be in a create, update and read request. |
| identityState | ENUM | CM | 1 | The state of a MnS consumer/producer, e.g., it could be active, inactive It could be in a create, update and read request. |
| identityStatus | ENUM | O | 1 | The security status of a MnS consumer/producer, e.g., secure, unsecure, unknown, etc. |
| identityOwner | String | O | 1 | The owner of the identity, e.g., it could be an operator, organization of an operator, vertical customer/tenant. It could be in a create, update and read request. |
| identityDomain | DN | O | 1 | The domain of a management functions as MnS producer/consumer, e.g., E2E domain, core domain, RAN domain, etc. It could be in a create, update and read request. |
| group | DN | CM | 1..N | The group(s) assigned to the identity, its list of DN of GroupInfo MOI. It could be in a create, update and read request. |

The output parameters for a CRUD operation for providing of the identity of the MnS producer/consumer are below: The attributes relation to the identity information may be as set out in the previous table.

| Attribute | Data type | P | Cardinality | Description |
|---|---|---|---|---|
| id | DN | M | 1 | It is in all responses. |
| result | ENUM | M | 1 | Result of provisioning, it could be successful, fail, etc. |
| identifier | String | CM | 1 | It could be in a create, update and read response. |
| identifierType | ENUM | CM | 1 | It could be in a create, update and read response. |
| identityType | ENUM | CM | 1 | It could be in a create, update and read response. |
| identityState | ENUM | CM | 1 | It could be in a create, update and read response. |
| identityStatus | ENUM | O | 1 | It could be in a create, update and read response. |
| assClient | DN | O | 1 | The associated (machine) client/application which acts on behalf of a human MnS consumer. e.g., it could be a digital portal, a mediated management function, etc. It could be in a read response after the MnS consumer has been authenticated. |
| identityOwner | String | C | | It could be in a create, update and read response. |
| identityDomain | DN | O | 1 | It could be in a create, update and read response. |
| group | DN | CM | 1..N | It could be in a create, update and read response. |
| authState | Boolean | O | 1 | It represents the authentication state of a MnS consumer. This is the MnS consumer represented/modelled as identity MOI in the CRUD request. The MOI is identified by the id It could be in read response |

The authentication request/response input parameters for an authenticate operation are below:

| Parameter | Data type | P | Cardinality | Description |
|---|---|---|---|---|
| identifier | String | M | 1 | A readable string to uniquely represent an identity, e.g. an email address, a username, IP address, FQDN (fully qualified domain name), etc. |
| credential | String | M | 1 | The credential used by the identity, e.g. password, certificate, biometric, etc. |
| assClient | String | O | 1 | The identifier (e.g., FQDN) of an associated (machine) client/application which acting on behalf of a human MnS consumer during authentication. e.g., it could be a digital portal, user agent, a mediated management function, etc. |

Note: more parameters may be required for different authentication protocols.

The authentication request/response output parameters for an authenticate operation are below:

| Attribute | Data type | P | Cardinality | Description |
|---|---|---|---|---|
| identifier | String | M | 1 | identifier of the MnS consumer |
| result | Boolean | M | 1 | Result of authentication |
| assertion | String | O | 1 | Authentication assertion if authentication service producer successfully authenticated the MnS consumer, and assertion is supported by the protocol. Note: the format of the assertion could be different for different authentication protocols. |

The management service consumer (MnSC) may be a machine user (client/application). For example the management service consumer may provide an analytics or orchestration function for autonomous management. The management service consumer (MnSC) may be a client/application acting on behalf of a human user (e.g. administrator, operator of the MnS provider or customer).

The directory may be an identity service, and the authentication (administrative) service consumer may call the directory service directly to provide identity and group of identities.

Some embodiments may be used in privileged access management (PAM)/Privileged Identity Management (PIM) applications that secures physical or virtual network or management functions and resources. This may for example be in the context of access control of 5G networks, network slice management, and/or automation.

Figure 3:
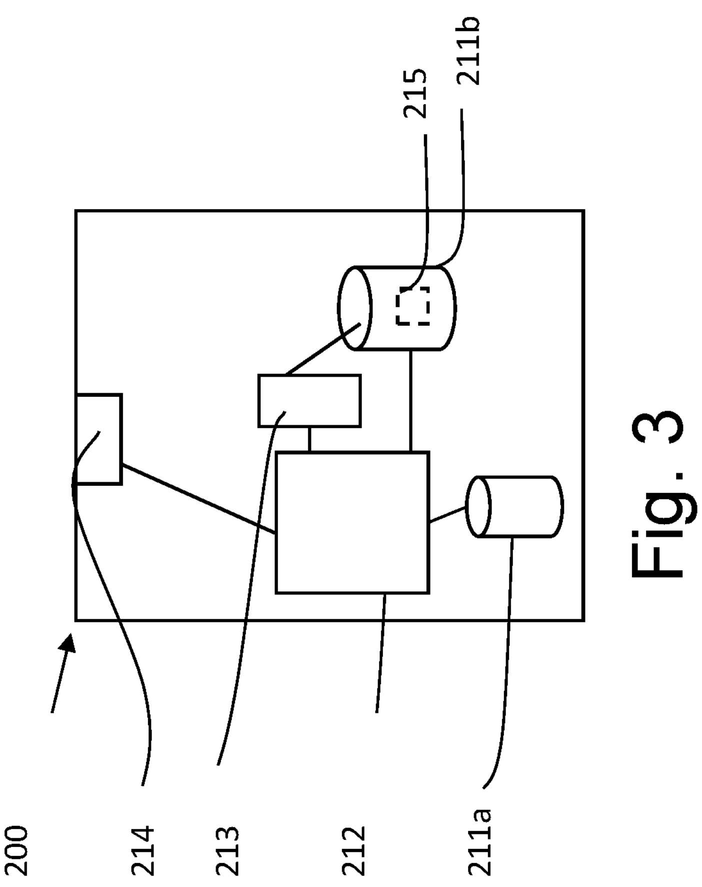
FIG. 3 shows a schematic diagram of an example apparatus.

FIG. 3 illustrates an example of an apparatus 200. This apparatus may be provided for example in an authentication service producer, an authentication service consumer or in an MnS consumer/producer. The apparatus may comprise at least one memory. By way of example only the at least one memory may comprise random access memory (RAM) 211*a* and at least on read only memory (ROM) 211*b*. Apparatus used by other embodiments may comprise different memory.

The apparatus may comprise at least one processor 212, 213. In this example apparatus, two processors are shown.

The apparatus may comprise an input/output interface 214.

The at least one processor may be coupled to the at least one memory. The at least one processor may be configured to execute an appropriate software code 215. The software code 215 may for example allow the method of some embodiments to be performed.

The software code 215 may be stored in the at least one memory, for example ROM 211*b*.

A method of some embodiments will now be described with reference to FIG. 10. The method may be performed by an apparatus. The apparatus may be provided in an authentication service producer or be an authentication service producer. The apparatus may be as shown for example in FIG. 3.

As referenced S1, the method comprises receiving an authentication request from a management service consumer, the request comprising an identifier associated with an identity of the management service consumer and a credential used by the identity.

As referenced S2, the method comprises authenticating, the management service consumer in dependence on the request, said authentication being dependent on one or more authentication policies associated with the management service consumer, different types of management service consumers being associated with one or more different authentication policies.

A method of some embodiments will now be described with reference to FIG. 11. The method may be performed by an apparatus. The apparatus may be provided in a MnS consumer or be a MnS consumer. The apparatus may be as shown for example in FIG. 3.

As referenced T1, the method comprises causing an authentication request to be sent to authentication service producer, the request comprising an identifier associated with an identity of a management service consumer and a credential used by the identity.

As referenced T2, the method comprises receiving a response to the authentication request from the authentication service producer, said authentication being dependent on one or more authentication policies associated with the management service consumer, different types of management service consumers being associated with one or more different authentication policies.

Although the apparatuses have been described as one entity, different modules and memory may be implemented in one or more physical or logical entities.

It is noted that whilst some embodiments have been described in relation to 5G system, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

Some embodiments may be implemented by circuitry. The term "circuitry" may refer to one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory (ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example, an integrated circuit or chiplet.

The embodiments of this disclosure may be implemented by computer software executable by a data processor, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks, and functions. The software may be stored on such physical media as memory chips, or memory blocks implemented within the processor, magnetic media such as hard disk or floppy disks, and optical media such as for example DVD and the data variants thereof, CD or any other suitable physical media. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory, and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples. Embodiments of the disclosure may be practiced in various components such as integrated circuit modules.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising:

one or more processors, and memory storing instructions that, when executed by the one or more processors, cause the apparatus to:

receive an authentication request from a management service consumer, the request comprising at least an identifier associated with an identity of the management service consumer and a credential used by the identity, wherein the request further comprises context information and information identifying a client;

receive a second request, the second request comprising at least one of:

authentication information about an authentication policy, the second request being one of a request to read the authentication policy, a request to create the authentication policy, a request to delete the authentication policy, and a request to update the authentication policy, group information about a group of one or more management service entities, the second request being one of a request to read the group information, a request to create the group, a request to delete the group, and a request to update the group, or identity information about the management service consumer or a management service producer, the second request being one of a request to read the identity information, a request to create an identity, a request to delete the identity, and a request to update the identity;

authenticate the management service consumer in dependence on the request, said authentication being dependent on the one or more authentication policies associated with the management service consumer, different types of management service consumers being associated with one or more different authentication policies; and provide an authentication assertion in response to a successful authentication comprising providing a response to the management service consumer indicating a successful authentication with the authentication assertion.

2. The apparatus as claimed in claim 1, wherein the request further comprises information identifying an application associated with the management service consumer.

3. The apparatus as claimed in claim 1, wherein the instructions, when executed by the one or more processors, cause the apparatus to obtain from a data store information associated with the identifier of the management service consumer and use the obtained information to authenticate the management service consumer.

4. The apparatus as claimed in in claim 3, wherein the instructions, when executed by the one or more processors, cause the apparatus to cause an update of an authentication status of the management service consumer in response to a successful authentication.

5. The apparatus as claimed in in claim 1, wherein the instructions, when executed by the one or more processors, cause the apparatus to receive an authentication policy request, the authentication policy request comprising information about an authentication policy.

6. The apparatus as claimed in claim 5, wherein the information about the authentication policy comprises at least one or more of: one or more authentication factors, or one or more authentication protocols.

7. The apparatus as claimed in claim 1, wherein one or more authentication policies associated with the management service consumer are provided in the request and/or are stored in a data store.

8. The apparatus as claimed in claim 1, wherein the instructions, when executed by the one or more processors, cause the apparatus to:

one of read, update, create, and delete the authentication policy in dependence on the second request.

9. The apparatus as claimed in claim 8, wherein the information about the authentication policy comprises at least one or more of: one or more authentication factor, authentication protocol, credential policy, and one or more authentication context parameters.

10. The apparatus as claimed in claim 1, wherein the instructions, when executed by the one or more processors, cause the apparatus to:

one of read, update, create, and delete information about the group in dependence on the second request.

11. The apparatus as claimed in claim 10, wherein the management service entities comprise management service consumers or management service producers.

12. The apparatus as claimed in claim 10, wherein the instructions, when executed by the one or more processors, cause the apparatus to cause an update when the group is updated, created, or deleted.

13. The apparatus as claimed in claim 10, wherein the instructions, when executed by the one or more processors, cause the apparatus to provide a group response comprising information about the group.

14. The apparatus as claimed in claim 13, wherein the group response comprises at least one or more identities and/or number of identities associated with the group.

15. The apparatus as claimed in claim 10, wherein the group information comprises at least one or more of: a state of the group, a type of the group, an owner of the group, a domain of the group, one or more authentication policies of the group, and a role of the group.

16. The apparatus as claimed in claim 1, wherein the instructions, when executed by the one or more processors, cause the apparatus to:

one of read, update, create, and delete information about the identity in dependence on the second request.

17. The apparatus as claimed in claim 16, wherein the identity information comprises at least one or more of: an identifier of the identity, a type of the identifier, a type of the identity, a state of the identity, a status of the identity, an owner of the identity, a domain of the identity, and a group of the identity.

18. The apparatus as claimed in claim 16, wherein the instructions, when executed by the one or more processors, cause the apparatus to associate the identity to one or more default group in response to a create request if no group information is provided in the create request.

19. The apparatus as claimed in claim 16, wherein the instructions, when executed by the one or more processors, cause the apparatus to cause updating of one or more groups in data store to add the identity to or delete the identity from an identity list of a respective group in dependence on the request.

20. An apparatus comprising:

one or more processors, and memory storing instructions that, when executed by the one or more processors, cause the apparatus to:

cause an authentication request to be sent to authentication service producer, the request comprising at least an identifier associated with an identity of a management service consumer and a credential used by the identity, wherein the request further comprises context information and information identifying a client;

send a second request, the second request comprising at least one of:

authentication information about an authentication policy, the second request being one of a request to read the authentication policy, a request to create the authentication policy, a request to delete the authentication policy, and a request to update the authentication policy, group information about a group of one or more management service entities, the second request being one of a request to read the group information, a request to create the group, a request to delete the group, and a request to update the group, or identity information about the management service consumer or a management service producer, the second request being one of a request to read the identity information, a request to create an identity, a request to delete the identity, and a request to update the identity; and receive a response to the authentication request from the authentication service producer, said authentication being dependent on the one or more authentication policies associated with the management service consumer, different types of management service consumers being associated with one or more different authentication policies, further comprising receiving an authentication assertion in response to a successful authentication comprising receiving a response from the authentication service producer indicating a successful authentication with the authentication assertion.

* * * * *